(12) United States Patent
Liu et al.

(10) Patent No.: US 12,055,083 B2
(45) Date of Patent: Aug. 6, 2024

(54) BASE METAL DOPED ZIRCONIUM OXIDE CATALYST SUPPORT MATERIALS

(71) Applicant: BASF Corporation, Florham Park, NJ (US)

(72) Inventors: Fudong Liu, New Providence, NJ (US); Michel Deeba, East Brunswick, NJ (US)

(73) Assignee: BASF Corporation, Florham Park, NJ (US)

( * ) Notice: Subject to any disclaimer, the term of this patent is extended or adjusted under 35 U.S.C. 154(b) by 531 days.

(21) Appl. No.: 17/250,732

(22) PCT Filed: Aug. 27, 2018

(86) PCT No.: PCT/US2018/048159
§ 371 (c)(1),
(2) Date: Feb. 26, 2021

(87) PCT Pub. No.: WO2020/046266
PCT Pub. Date: Mar. 5, 2020

(65) Prior Publication Data
US 2021/0348534 A1    Nov. 11, 2021

(51) Int. Cl.
*B01J 21/06*    (2006.01)
*B01J 23/02*    (2006.01)
(Continued)

(52) U.S. Cl.
CPC ............ *F01N 3/101* (2013.01); *B01J 21/066* (2013.01); *B01J 23/10* (2013.01); *B01J 23/44* (2013.01);
(Continued)

(58) Field of Classification Search
CPC . B01J 21/04; B01J 21/066; B01J 23/02; B01J 23/10; B01J 23/40; B01J 23/42;
(Continued)

(56) References Cited

U.S. PATENT DOCUMENTS

| 4,171,288 A | 10/1979 | Keith et al. |
| 6,800,158 B2 * | 10/2004 | Polikarpus .......... C04B 35/4885 264/618 |

(Continued)

FOREIGN PATENT DOCUMENTS

| CN | 104937225 A | 9/2015 |
| JP | H07-194973 A | 8/1992 |

(Continued)

OTHER PUBLICATIONS

First Office Action from corresponding Chinese Application No. 201880099061.4 dated Feb. 7, 2023, and a machine generated translation.

(Continued)

*Primary Examiner* — Cam N. Nguyen
(74) *Attorney, Agent, or Firm* — DLA Piper LLP (US)

(57) ABSTRACT

This disclosure is directed to catalyst compositions, catalytic articles for purifying exhaust gas emissions and methods of making and using the same. In particular, the disclosure relates to a catalytic article including a catalytic material on a substrate, wherein the catalytic material has a first layer and a second layer. The first layer includes a platinum group metal (PGM) component impregnated on a porous support material; and the second layer includes a rhodium component impregnated on a support material, wherein the support material is a composite material including zirconia doped with baria, alumina, or combinations thereof, wherein the zirconia-based support material includes zirconia in an amount from about 80 to about 99 wt. %.

20 Claims, 19 Drawing Sheets

(51) Int. Cl.

| | |
|---|---|
| *B01J 23/10* | (2006.01) |
| *B01J 23/40* | (2006.01) |
| *B01J 23/42* | (2006.01) |
| *B01J 23/44* | (2006.01) |
| *B01J 23/46* | (2006.01) |
| *B01J 23/58* | (2006.01) |
| *B01J 23/63* | (2006.01) |
| *B01J 35/04* | (2006.01) |
| *B01J 35/10* | (2006.01) |
| *B01J 35/56* | (2024.01) |
| *B01J 35/60* | (2024.01) |
| *B01J 37/02* | (2006.01) |
| *B01J 37/08* | (2006.01) |
| *B01J 37/10* | (2006.01) |
| *F01N 3/035* | (2006.01) |
| *F01N 3/10* | (2006.01) |

(52) U.S. Cl.
CPC ............ *B01J 23/464* (2013.01); *B01J 35/56* (2024.01); *B01J 35/60* (2024.01); *B01J 37/0207* (2013.01); *B01J 37/082* (2013.01); *B01J 37/10* (2013.01); *F01N 3/035* (2013.01); *F01N 2250/02* (2013.01)

(58) Field of Classification Search
CPC . B01J 23/44; B01J 23/464; B01J 23/58; B01J 23/63; B01J 35/04; B01J 35/10; B01J 37/0207; B01J 37/082; B01J 37/10; F01N 3/035; F01N 3/101
USPC ........ 502/302–304, 327–328, 332–334, 339, 502/349, 415, 439, 527.12, 527.13
See application file for complete search history.

(56) References Cited

U.S. PATENT DOCUMENTS

| | | | |
|---|---|---|---|
| 7,754,171 B2* | 7/2010 | Chen ................... | B01J 37/0244 60/302 |
| 7,758,834 B2* | 7/2010 | Chen .................. | F01N 13/0097 60/299 |
| 7,759,279 B2* | 7/2010 | Shiratori .............. | B01J 37/0221 502/303 |
| 8,568,675 B2* | 10/2013 | Deeba ................. | B01J 37/0248 422/177 |
| 8,673,809 B2 | 3/2014 | Nakatsuji et al. | |
| 8,950,170 B2* | 2/2015 | Paradise ................... | F02C 7/12 60/734 |
| 9,242,242 B2* | 1/2016 | Hilgendorff ............. | B01J 23/58 |
| 9,266,092 B2 | 2/2016 | Arnold et al. | |
| 9,540,980 B2* | 1/2017 | Hilgendorff ............. | B01J 23/58 |
| 10,247,071 B2* | 4/2019 | Wang .................... | B01J 37/0215 |
| 10,464,052 B2* | 11/2019 | Hilgendorff ........... | B01D 53/94 |
| 10,512,898 B2* | 12/2019 | Deeba .................. | B01J 35/0006 |
| 10,603,655 B2* | 3/2020 | Chandler .............. | F01N 3/0842 |
| 10,695,749 B2* | 6/2020 | Xiao ...................... | B01J 23/72 |
| 10,773,209 B2* | 9/2020 | Liu .......................... | B01J 35/56 |
| 10,828,602 B2* | 11/2020 | Sakurada .............. | B01D 53/94 |
| 10,883,402 B2* | 1/2021 | Wang ................... | B01J 37/0201 |
| 11,130,117 B2* | 9/2021 | Gu ........................ | B01J 23/63 |
| 11,131,225 B2* | 9/2021 | Liu ......................... | F01N 3/035 |
| 11,248,505 B2* | 2/2022 | Sung ...................... | B01J 23/42 |
| 11,260,372 B2* | 3/2022 | Xue ...................... | B01J 37/0244 |
| 2004/0205523 A1 | 10/2004 | Miller et al. | |
| 2008/0045404 A1* | 2/2008 | Han ...................... | B01J 37/0248 502/333 |
| 2009/0175773 A1* | 7/2009 | Chen .................... | B01J 20/3021 422/177 |
| 2014/0369912 A1* | 12/2014 | Zheng .................. | B01J 35/1014 502/439 |
| 2018/0071679 A1* | 3/2018 | Karpov .................... | B01J 21/06 |
| 2019/0105636 A1* | 4/2019 | Wang ...................... | F01N 3/2828 |
| 2019/0160427 A1* | 5/2019 | Deeba .................. | B01J 37/0228 |
| 2019/0240643 A1* | 8/2019 | Karpov .................. | B01J 23/464 |
| 2020/0030745 A1* | 1/2020 | Utschig ................ | B01J 37/0244 |
| 2020/0032687 A1* | 1/2020 | Utschig .................. | B01J 35/396 |
| 2020/0347763 A1* | 11/2020 | Liu ......................... | B01J 23/464 |
| 2022/0072514 A1* | 3/2022 | Chandler ............. | B01J 37/0036 |

FOREIGN PATENT DOCUMENTS

| | | |
|---|---|---|
| JP | 2002-331240 A | 11/2002 |
| JP | 2010-058110 A | 3/2010 |
| JP | 2016-505380 A | 2/2016 |
| WO | 103855 A1 | 6/2017 |

OTHER PUBLICATIONS

Decision of Refusal dated Jan. 10, 2023, of counterpart Japanese Patent Application No. 2021-511556, along with an English translation.

European Search Report dated Feb. 17, 2022 for European Application No. 18931500.5.

Viparelli, P. et al. "Catalyst based on BaZrO"3 with different elements incorporated in the structure", Applied Catalysis A: General, Elsevier, Amsterdam, NL, vol. 280, No. 2, Mar. 8, 2005 (Mar. 8, 2005), pp. 225-232.

International Search Report dated May 23, 2019 for International Application No. PCT/US2018/048159.

Burch, R. et al., "An investigation of the use of zirconia as a support for rhodium catalysts", Applied Catalysis A: General, 1996, vol. 143, No. 2, pp. 317-335.

Centi, G., "Oscillating Behavior in N2O Decomposition over Rh Supported on Zirconia-Based Catalysts", Journal of Catalysis, 2000, vol. 194, No. 1, pp. 130-139.

Drif, A. et al., "Study of the dry reforming of methane and ethanol using Rh catalysts supported on doped alumina", Applied Catalysis A: General, 2015, vol. 504, pp. 576-584.

Kawabata, H. et al., "Active three-way catalysis of rhodium particles with a low oxidation state maintained under an oxidative atmosphere on a La-containing ZrO2 support", Chemical Communications, 2013, vol. 49, No. 38, pp. 4015-4017.

Kroner, A. B. et al., "Structural Characterization of Alumina-Supported Rh Catalysts: Effects of Ceriation and Zirconiation by using Metal-Organic Precursors", ChemPhysChem, 2013, vol. 14, No. 15, pp. 3606-3617.

Second Office Action dated Aug. 21, 2023, of counterpart Chinese Patent Application No. 201880099061.4, along with an English machine translation.

Notice of Allowance dated Dec. 22, 2023, of counterpart Korean Patent Application No. 10-2021-7008564, along with an English machine translation.

Office Action issued in corresponding Japanese Patent Appln. No. 2023-073066 dated Apr. 30, 2024, along with an English translation.

* cited by examiner

Catalyst Layer Design

| | |
|---|---|
| Top Layer | |
| Bottom Layer | |
| Substrate | |

Reference Catalyst Design #1

| |
|---|
| Rh/ZrO$_2$ + Pd/Al$_2$O$_3$ |
| Pd/Al$_2$O$_3$ + Pd/OSC (Ce-ZrO$_2$) + BaO |
| Substrate |

Reference Catalyst Design #2

| |
|---|
| Rh/ZrO$_2$ + Al$_2$O$_3$ |
| Pd/Al$_2$O$_3$ + Pd/OSC (Ce-ZrO$_2$) + BaO |
| Substrate |

Reference Catalyst Design #3

| |
|---|
| Pd/Al$_2$O$_3$ + Pd/OSC (Ce-ZrO$_2$) + BaO |
| Rh/ZrO$_2$ + Pd/Al$_2$O$_3$ |
| Substrate |

Invention Catalyst Design #1

| |
|---|
| Rh/doped ZrO$_2$ + Pd/Al$_2$O$_3$ |
| Pd/Al$_2$O$_3$ + Pd/OSC-1 (Ce-ZrO$_2$) + BaO |
| Substrate |

Invention Catalyst Design #2

| |
|---|
| Rh/doped ZrO$_2$ + Al$_2$O$_3$ |
| Pd/Al$_2$O$_3$ + Pd/OSC (Ce-ZrO$_2$) + BaO |
| Substrate |

Invention Catalyst Design #3

| |
|---|
| Pd/Al$_2$O$_3$ + Pd/OSC (Ce-ZrO$_2$) + BaO |
| Rh/doped ZrO$_2$ + Pd/Al$_2$O$_3$ |
| Substrate |

FIGURE 1

Invention Catalyst 1

| Pd/La$_2$O$_3$-Al$_2$O$_3$ + Rh/BaO-ZrO$_2$ |
|---|
| Pd/La$_2$O$_3$-Al$_2$O$_3$ + Pd/CeO$_2$-ZrO$_2$ + BaO |
| Substrate |

Invention Catalyst 2

| Pd/La$_2$O$_3$-Al$_2$O$_3$ + Rh/Al$_2$O$_3$-ZrO$_2$ |
|---|
| Pd/La$_2$O$_3$-Al$_2$O$_3$ + Pd/CeO$_2$-ZrO$_2$ + BaO |
| Substrate |

Reference Catalyst

| Pd/La$_2$O$_3$-Al$_2$O$_3$ + Rh/La$_2$O$_3$-ZrO$_2$ |
|---|
| Pd/La$_2$O$_3$-Al$_2$O$_3$ + Pd/CeO$_2$-ZrO$_2$ + BaO |
| Substrate |

FIGURE 12

BASE METAL DOPED ZIRCONIUM OXIDE CATALYST SUPPORT MATERIALS

This application is a national stage filing under 35 U.S.C. § 371 of International Application No. PCT/US2018/048159, filed on Aug. 27, 2018; the contents of this application is incorporated herein by reference in its entirety.

FIELD OF THE INVENTION

This invention is directed to catalyst compositions and catalytic articles for purifying exhaust gas emissions, as well as methods of making and using the same.

BACKGROUND OF THE INVENTION

Various catalysts have been developed for purifying the exhaust gas emitted from internal combustion engines by reducing harmful components contained in the exhaust gas such as hydrocarbons (HCs), nitrogen oxides ($NO_x$) and carbon monoxide (CO). These catalysts are usually part of an exhaust gas treatment system, which may further comprise catalytic converters, evaporative emissions devices, scrubbing devices (e.g., for removal of hydrocarbon, sulfur, and the like), particulate filters, traps, adsorbers, absorbers, non-thermal plasma reactors, and the like, as well as combinations of at least two of the foregoing devices. Each of these devices individually or in combination may be rated in terms of its ability to reduce the concentration of any one of the harmful component(s) in an exhaust gas stream under various conditions.

Catalytic converters, for example, are one type of an exhaust emission control device used within an exhaust gas treatment system, and comprise one or more catalytic materials disposed on one or more substrates. The composition of the catalytic material(s), the type of substrate(s), and the method by which the catalytic material is disposed on the substrate are ways in which catalytic converters are differentiated from one another. For example, three-way conversion (TWC) catalysts located in catalytic converters typically comprise one or more platinum group metals (PGMs) (e.g., platinum, palladium, rhodium, and/or iridium) located upon one or more supports such as high surface area, refractory oxide supports (e.g., high surface area aluminas or mixed metal oxide composite supports). The supported PGMs are carried on a suitable substrate, such as a monolithic substrate comprising a refractory ceramic or metal honeycomb structure. Many TWC catalysts are manufactured with at least two separate catalyst coating compositions (washcoats) that are applied in the form of aqueous dispersions as successive layers on a substrate. For example, PGMs such as palladium and rhodium, which typically represent the main catalytically active species in a TWC catalyst, are often applied as separate washcoats. Separation of palladium and rhodium into individual washcoat layers has been shown to prevent the formation of alloys, which are known to be less catalytically active. Generally, a TWC catalyst promotes oxidation by oxygen in the exhaust gas stream of unburned hydrocarbons (HCs) and carbon monoxide (CO) as well as the reduction of nitrogen oxides ($NO_x$) to nitrogen. Oxidization of CO and HCs and reduction of $NO_x$ occur substantially simultaneously. Emission standards for unburned hydrocarbons, carbon monoxide and nitrogen oxide contaminants continue to become more stringent. In order to meet such standards, catalytic converters containing a TWC catalyst are located in the exhaust gas line of internal combustion engines.

Many catalyst components, including TWC catalysts, used to treat the exhaust gas of internal combustion engines are less effective during periods of low temperature operation (e.g., lower than 200° C.), such as the initial cold-start period of engine operation. During this time period, the operating temperatures of catalyst components are generally too low for treating engine exhaust gas efficiently. This is particularly true for downstream catalyst components of an engine exhaust gas treatment system, which are further removed from the engine, and often take several minutes to reach a suitable operating temperature.

U.S. Patent Appln. Pub. No. 2014/0205523, incorporated herein by reference, is directed to automotive catalyst composites having a two-metal containing layer, where the two-metal containing layer is formed from a single washcoat layer. This washcoat layer contains two PGMs, each of which is on its own support, resulting in a homogeneous mixture of the two supported PGMs in the same layer. This layer is coated on a catalyst substrate.

Aluminum oxide ($Al_2O_3$) is a material that is commonly used as a PGM support in three-way conversion catalysts for gasoline emission control due to its high hydrothermal stability. However, there are certain disadvantages associated with the use of $Al_2O_3$ as a rhodium (Rh) support for NOx reduction purposes. Because of the strong metal-support interaction on $Rh/Al_2O_3$ with the formation of a stable rhodium aluminate complex dominating in vehicle fuel shutoff running conditions, the Rh catalytic sites are more difficult to regenerate to form metallic $Rh^0$ species (which are required for NOx reduction activity), thereby resulting in an activity loss for NOx reduction (see, Catalysts 2015, 5(4), 1770-1796, which is herein incorporated by reference). Therefore, Rh supports such as zirconium oxide ($ZrO_2$)-based materials draw a lot of attention from researchers as a relatively weak metal-support interaction exists between Rh and $ZrO_2$ and the reducibility of $RhO_x$ species during catalyst regeneration can be greatly improved. However, a disadvantage of using a $ZrO_2$ material as a PGM support is its low hydrothermal stability. As is known in the art, TWC catalyst operation conditions are extremely harsh and includes high heat, a high amount of steam, and a large number of lean-rich cycles. Typical TWC catalyst aging temperatures before performance evaluation in the industry are usually above 1000° C., and $ZrO_2$-based materials tend to collapse during this process and lose surface area and pore volume. $ZrO_2$ materials can be doped, providing supports such as $La_2O_3$—$ZrO_2$ and $Y_2O_3$—$ZrO_2$; however, sintering of the $ZrO_2$ component still occurs and therefore remains a problem which restricts its wide application in the gasoline emission control field.

There is a continuing need to provide TWC catalysts that utilize metals (e.g., PGMs) efficiently and remain effective to treat exhaust gas to meet regulated HC, NOx, and CO conversions. In particular, there is a continuing need to provide support materials that effectively support active metal (e.g., Rh) components, wherein the resulting supported metal species demonstrates good NOx reduction properties and good hydrothermal stability.

SUMMARY OF THE INVENTION

The invention relates to a three-way conversion (TWC) catalytic material and catalytic article with low light-off temperature for the conversion of $NO_x$, CO, and HC. The invention also relates to using such TWC materials and articles to treat exhaust gas streams. The present disclosure provides innovative modifications of $ZrO_2$ support materials using several dopants such as BaO, SrO, $Al_2O_3$, and/or $Nb_2O_5$. The $ZrO_2$-based support materials described herein can be useful as Rh supports for use in TWC catalysts. As compared to other TWC catalysts which incorporate rhodium, Catalysts containing rhodium supported on the $ZrO_2$ support materials described herein demonstrate improved reducibility of RhOx species and/or improved Rh dispersion even on the high density $ZrO_2$ materials after severe aging at high temperatures. Accordingly, significantly enhanced light-off performance for CO, NOx and HC on supported Rh powder catalysts described herein (e.g., Rh/BaO—$ZrO_2$, Rh/$Al_2O_3$—$ZrO_2$) can be achieved, as compared to conventional catalyst materials wherein the Rh is supported on other support materials (e.g., Rh/$La_2O_3$—$ZrO_2$). As described in more detail below, catalysts described herein exhibited greatly improved NOx performance not only in Gasoline System Simulator (GSS) evaluation, but also in real vehicle evaluation. Using the $ZrO_2$-based support materials disclosed herein as support materials for Rh, to achieve a similar NOx emission standard set by previous technology, lower amounts of Rh can be used as the Rh efficiency has been greatly improved. This is very beneficial to the cost reduction of TWC catalyst production and can provide competitive catalyst pricing for automotive makers.

In particular, the TWC catalytic material of the disclosure contains a rhodium component impregnated on a support material, wherein the support material is a composite material comprising zirconia doped with baria, alumina, or combinations thereof, wherein the zirconia-based support material comprises zirconia in an amount from about 80 to about 99 wt. %.

In some embodiments of the present invention, catalyst composites are provided, the catalyst composites comprising: a catalytic material on a carrier, the catalytic material comprising at least two layers: a first layer (also referred to as a bottom layer) deposited directly on the carrier, comprising a first palladium component supported on a first refractory metal oxide component, a first oxygen storage component, or a combination thereof, a second layer (also referred to as a top layer) deposited on top of the first layer, comprising a rhodium component supported on a second refractory metal oxide component (e.g., the $ZrO_2$-based support materials described herein) and a second palladium component supported on a second oxygen storage component, a third refractory metal oxide component or a combination thereof, wherein the catalytic material is effective for carrying out three-way conversion (TWC).

In one or more embodiments, the first layer is substantially free of any other platinum group metals (beyond palladium). The first layer may further comprise barium oxide, strontium oxide, or combinations thereof. The first layer may comprise about 40-95% (or about 65-90%) by weight of the total palladium content of the composite and the second layer comprises about 5-60% (or about 10-35%) by weight of the total palladium content of the composite. The second layer may comprise a weight ratio of the palladium component to the rhodium component in the range of about 0.1:1 to about 20:1 (or about 0.5:1 to about 10:1, or even about 1:1 to about 5:1). In the first layer, the palladium component may be supported on both the first refractory metal oxide component and the first oxygen storage component, the first refractory metal oxide component comprising a stabilized alumina and the first oxygen storage component comprising about 25-50% by weight of ceria based on the total weight of the first oxygen storage component. The stabilized alumina of the first refractory metal oxide component may comprise activated alumina, lanthana-alumina, baria-alumina, ceria-alumina, ceria-lanthana-alumina, zirconia-alumina, ceria-zirconia-alumina, or combinations thereof.

The first layer may comprise, by weight percent of the first layer: the first refractory metal oxide component in an amount of about 50-95% (or about 20-80%); the first oxygen storage component comprising a first ceria-zirconia composite in an amount of about 20-80%; and at least one promoter or stabilizer selected from lanthana, baria, zirconia, and strontium in an amount of up to about 10% (or about 0.1-10%, or about 0.1-5%); wherein the first ceria-zirconia composite comprises ceria in an amount of about 25-50% by weight of the first ceria-zirconia composite.

The second layer may comprise, by weight percent of the second layer: the second refractory metal oxide component in an amount of about 50-80%; and the second oxygen storage component comprising a second ceria-zirconia composite or the third refractory metal oxide component in an amount of about 20-50%; at least one promoter or stabilizer selected from lanthana, baria, zirconia, and strontium in an amount of up to about 10% (or about 0.1-10%, or about 0.1-5%); wherein the second ceria-zirconia composite comprises ceria in an amount of about 10-50% by weight of the second ceria-zirconia composite.

The total palladium content of the first layer may be supported on the first refractory metal oxide component or about 40-80% of the total palladium content of the first layer is supported on the first oxygen storage component. The palladium content on the first oxygen storage component may be about 0.5-3% by weight of the first oxygen storage component and the first layer may optionally further comprise palladium on the first refractory metal oxide component.

In the second layer, the second refractory metal oxide component for supporting the rhodium component may comprise an alumina-based support or a zirconia-based support. In some embodiments, at least a portion of the porous support material comprises an oxygen storage component selected from ceria, zirconia, lanthana, yttria, neodymia, praseodymia, niobia, and combinations thereof. In various embodiments, the second refractory metal oxide component for supporting the rhodium component may comprise an activated alumina compound selected from the group consisting of alumina, zirconia-stabilized alumina, lanthana-alumina, baria-alumina, ceria-alumina, zirconia-alumina, ceria-zirconia-alumina, lanthana-zirconia-alumina, baria-lanthana-alumina, baria-lanthana-neodymia alumina, and combinations thereof. The second refractory metal oxide component for supporting the rhodium component may comprise about 20% by weight zirconia-stabilized alumina based on the total weight of the second refractory metal oxide component. The second refractory metal oxide component for supporting the rhodium component may comprise a zirconia-based support selected from the group consisting of zirconia, lanthana-zirconia, titania-zirconia, titania-lanthana-zirconia, and combinations thereof. The second palladium component of the second layer may be supported on the second oxygen storage component comprising a ceria-zirconia composite comprising about 10-50% by weight of ceria based on the total weight of the second oxygen storage component. The second palladium component of the second layer may be supported on the third refractory metal oxide component comprising alumina, stabilized alumina, praseodymia-zirconia, or combinations thereof.

The catalyst composite may further comprise an undercoat layer between the carrier and the first layer, wherein the undercoat layer is substantially free of any platinum group metals and comprises alumina. The carrier may be a flow-through substrate or a wall-flow filter. The first layer may be deposited on inlet channels of a wall flow filter and the second layer is deposited on outlet channels of the wall flow filter.

In some embodiments, the palladium-containing first layer may be zoned. The second layer may be zoned. A loading of the first layer may be in the range of about 1.5-4.0 g/in$^3$ and a loading of the second layer is in the range of about 0.75-2.0 g/in$^3$.

The catalyst composite may further comprise a middle palladium-containing layer between the first layer and the second layer, wherein the first layer comprises the palladium component supported on the first oxygen storage component and the middle layer comprises a palladium component supported on a fourth refractory metal oxide component and is substantially free of an oxygen storage component.

A further aspect of the present disclosure is an exhaust gas treatment system comprising any catalyst composite disclosed herein located downstream of a gasoline engine. The automotive catalyst composite may be located downstream of a gasoline engine in a close-coupled position, in a position downstream of the close-coupled position, or both.

Another aspect of the present disclosure is a method for treating an exhaust gas comprising hydrocarbons, carbon monoxide, and nitrogen oxides comprising: contacting the exhaust gas with any automotive catalyst composite disclosed herein.

The invention includes, without limitation, the following embodiments.

Embodiment 1: A catalyst composition comprising: a rhodium component impregnated on a support material, wherein the support material is a zirconia-based support material comprising zirconia doped with baria, alumina, or combinations thereof, wherein the zirconia-based support material comprises zirconia in an amount from about 80 to about 99 wt. %.

Embodiment 2: The catalyst composition of any preceding embodiment, wherein the zirconia-based support material is co-doped with at least one of $La_2O_3$, $Y_2O_3$, $Nd_2O_3$, and $Pr_6O_{11}$.

Embodiment 3: The catalyst composition of any preceding embodiment, wherein the rhodium component is present in an amount ranging from about 0.01% to about 10 wt. % based on the total weight of the catalyst composition.

Embodiment 4: The catalyst composition of any preceding embodiment, wherein the zirconia-based support material is baria-doped zirconia, and wherein barium is present in an amount ranging from about 0.5 to about 20 wt. % based on the total weight of the zirconia-based support material.

Embodiment 5: The catalyst composition of any preceding embodiment, wherein the zirconia-based support material is alumina-doped zirconia, and wherein aluminum is present in an amount ranging from about 0.5 to about 10 wt. % based on the total weight of the zirconia-based support material.

Embodiment 6: A catalytic article comprising a catalytic material on a substrate, the catalytic material comprising: a first layer comprising a platinum group metal (PGM) component impregnated on a porous support material; and a second layer comprising the catalyst composition of any one of preceding embodiments.

Embodiment 7: The catalytic article of any preceding embodiment, wherein at least a portion of the porous support material comprises an oxygen storage component selected from ceria, zirconia, lanthana, yttria, neodymia, praseodymia, niobia, and combinations thereof.

Embodiment 8: The catalytic article of any preceding embodiment, wherein the oxygen storage component is ceria-zirconia, comprising ceria in an amount from about 5 to about 75 wt. %.

Embodiment 9: The catalytic article of any preceding embodiment, wherein at least a portion of the porous support material is a refractory metal oxide support material selected from alumina, lanthana-alumina, ceria-alumina, zirconia-alumina, ceria-zirconia-alumina, lanthana-zirconia-alumina, lanthana-neodymia-alumina, and combinations thereof.

Embodiment 10: The catalytic article of any preceding embodiment, wherein the PGM component is a palladium component.

Embodiment 11: The catalytic article of any preceding embodiment, wherein the second layer further comprises barium oxide, magnesium oxide, calcium oxide, strontium oxide, lanthanum oxide, cerium oxide, zirconium oxide, manganese oxide, copper oxide, iron oxide, praseodymium oxide, yttrium oxide, neodymium oxide, or any combination thereof.

Embodiment 12: The catalytic article of any preceding embodiment, wherein the first layer comprises barium oxide and a palladium component impregnated on ceria-zirconia or lanthana-alumina.

Embodiment 13: The catalytic article of any preceding embodiment, wherein the first layer is directly disposed on the substrate and the second layer is disposed on top of the first layer.

Embodiment 14: The catalytic article of any preceding embodiment, wherein the substrate is a metal or ceramic monolithic honeycomb substrate.

Embodiment 15: The catalytic article of any preceding embodiment, wherein the substrate is a wall flow filter substrate or a flow through substrate.

Embodiment 16: A method of making the catalytic article of any preceding embodiment, comprising: disposing the catalytic material on the substrate to yield a catalytic material-coated substrate, and calcining the catalytic material-coated substrate to render the catalytic article.

Embodiment 17: A method of making the catalyst composition of any preceding embodiment, comprising: (a) providing a composite support material comprising zirconia doped with baria, alumina, or combinations thereof, (b) calcining the composite support material provided in step (a) to provide a calcined zirconia-based support material; (c) impregnating a rhodium component on the calcined zirconia-based support material obtained from step (b) to give a rhodium component-impregnated zirconia-based support material; (d) calcining the product obtained from step (c) to obtain the catalyst composition.

Embodiment 18: The method of embodiment 17, wherein step (c) comprises combining the calcined zirconia-based support material with a rhodium component precursor to give the rhodium component-impregnated zirconia-based support material, wherein the rhodium component precursor is rhodium chloride, rhodium nitrate, rhodium acetate, or a combination thereof.

Embodiment 19: The method of making the catalyst composition according to any preceding embodiment, wherein the baria, alumina, or combination thereof is doped into the $ZrO_2$ material either by an incipient wetness impregnation method or a co-precipitation method.

Embodiment 20: The method of making the catalyst composition according to any preceding embodiment, further comprising disposing the catalyst material onto a substrate to form a catalytic article.

Embodiment 21: A method for reducing CO, HC, and $NO_x$ levels in a gas stream, comprising contacting the gas stream with the catalytic article of any preceding embodiment for a time and at a temperature sufficient to reduce CO, HC, and $NO_x$ levels in the gas stream.

Embodiment 22: The method of embodiment 21, wherein the CO, HC, and $NO_x$ levels in the gas stream are reduced by at least 50% compared to the CO, HC, and $NO_x$ levels in the gas stream prior to contact with the catalytic article.

Embodiment 23: An emission treatment system for treatment of an exhaust gas stream, the emission treatment system comprising: an engine producing an exhaust gas stream; and the catalytic article of any preceding embodiment positioned downstream from the engine in fluid communication with the exhaust gas stream and adapted for the abatement of CO and HC and conversion of $NO_x$ to $N_2$.

Embodiment 24: The emission treatment system of embodiment 23, wherein the engine is a gasoline engine or diesel engine.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

FIG. 1 is schematic representations of catalytic composites according to the present disclosure and corresponding reference catalytic composites for comparative purposes;

FIG. 12 is schematic representations of catalytic composites according to the present disclosure and corresponding reference catalytic composites for comparative purposes;

DETAILED DESCRIPTION OF THE INVENTION

Figure 2A:
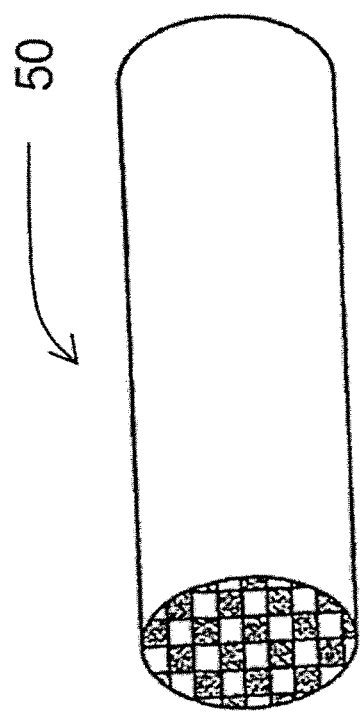
FIG. 2A is a perspective view of a wall flow filter substrate.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

The present invention relates to a catalytic material and a three-way conversion (TWC) catalytic article incorporating such a catalytic material capable of exhibiting a low light-off temperature for the conversion of HC, CO, and $NO_x$ in exhaust gas. The catalytic material of the invention includes at least two catalyst compositions, which are disposed onto a substrate, e.g., in a layered configuration, to generate a TWC catalytic article. One of these catalyst compositions (typically used as the second/top layer of the article) is referred to herein as a "rhodium-containing layer" and comprises a rhodium component supported on a $ZrO_2$-based support material. The second catalyst composition (typically used as the first/bottom layer of the article) generally comprises a palladium component and a support material, as described in more detail below.

It was surprisingly discovered that $ZrO_2$ materials with different effective dopants (e.g., BaO, SrO, $Al_2O_3$, $Nb_2O_5$) for supporting Rh can be useful to greatly promote the reducibility of Rh active sites or to improve the Rh dispersion, thus enhancing the final TWC performance. As compared to a conventional reference $Rh/ZrO_2$ material (e.g., $Rh/La_2O_3$—$ZrO_2$), the catalysts disclosed herein in powder form using novel $ZrO_2$ materials as Rh supports (Rh/BaO—$ZrO_2$, Rh/$Al_2O_3$—$ZrO_2$) showed much better light-off performance for CO, NOx and HC. When incorporated into the washcoated monolith catalysts with dual layers, embodiments of catalysts disclosed herein that contain Rh/BaO—$ZrO_2$ and Rh/$Al_2O_3$—$ZrO_2$ in the top layer exhibited extremely good NOx reduction performance without sacrificing HC and CO performance. Accordingly, $ZrO_2$-based support materials disclosed herein can be effective Rh supports for TWC application to treat gasoline engine emission, and advantageously can allow for the use of less Rh necessary to achieve comparable results.

As used herein, "platinum group metal component," "platinum (Pt) component," "rhodium (Rh) component," "palladium (Pd) component," "iridium (Ir) component," "ruthenium (Ru) component" and the like refers the respective platinum group metal compound, complex, or the like which, upon calcination or use of the catalyst decomposes or otherwise converts to a catalytically active form, usually, the metal or the metal oxide.

As used herein, "impregnated" or "impregnation" refers to permeation of the catalytic material into the porous structure of the support material.

"Washcoat" is a thin, adherent coating of a catalytic or other material applied to a refractory substrate, such as a honeycomb flow through monolith substrate or a filter substrate, which is sufficiently porous to permit the passage there through of the gas stream being treated. A "washcoat layer," therefore, is defined as a coating that is comprised of support particles. "BET surface area" has its usual meaning of referring to the Brunauer-Emmett-Teller method for determining surface area by $N_2$-adsorption measurements. Unless otherwise stated, "surface area" refers to BET surface area.

In the present disclosure, "%" refers to "wt. %" or "mass %", unless otherwise stated.

As used herein, the term "substantially free" means that there is generally less than about 1 wt. %, including less than about 0.75 wt. %, less than about 0.5 wt. %, less than about 0.25 wt. %, or less than about 0.1 wt. %, of metal (i.e., a PGM metal) or support material (i.e., OSC) present in the washcoat layer. In some embodiments, no such metal or support material has been intentionally added to the washcoat layer. In some embodiments, "substantially free of Pd" includes "free of Pd." Likewise, "substantially free of OSC" includes "free of OSC." It will be appreciated by one of skill in the art, however that during loading/coating, trace amounts of metal or support material may migrate from one washcoat component to another, such that trace amounts of metal or support material can be present in the washcoat of the catalyst composition.

As used herein, the term "Pd-only" refers to washcoat composition having Pd as the only metal intentionally present and that there is generally less than about 1 wt. %, including less than about 0.75 wt. %, less than about 0.5 wt. %, less than about 0.25 wt. %, or less than about 0.1 wt. %, of a second metal (i.e., a PGM metal) present in the washcoat layer. In some embodiments, no such metal has been intentionally added to the washcoat layer.

As used herein, the term "substantially uniform" means that the washcoat(s) containing any metals (e.g., PGM) and/or support materials (e.g., refractory metal oxides, OSC) were deposited onto the carrier in a consistent manner to achieve an evenly distributed coating of the washcoat, thereby having essentially the same amount of metals and/or support materials deposited onto the surface of the carrier.

As used herein, the term "catalyst" or "catalyst composition" refers to a material that promotes a reaction.

As used herein, the term "catalytic article" refers to an element that is used to promote a desired reaction. For example, a catalytic article may comprise a washcoat containing catalytic compositions on a substrate.

As used herein, the term "light-off temperature" refers to the temperature at which 50% conversion of exhaust gas is attained and is often referred to as $T_{50}$.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "stream" broadly refers to any combination of flowing gas that may contain solid or liquid particulate matter. The term "gaseous stream" or "exhaust gas stream" means a stream of gaseous constituents, such as the exhaust of a combustion engine, which may contain entrained non-gaseous components such as liquid droplets, solid particulates, and the like. The exhaust gas stream of a combustion engine typically further comprises combustion products ($CO_2$ and $H_2O$), products of incomplete combustion (carbon monoxide (CO) and hydrocarbons (HC)), oxides of nitrogen ($NO_x$), combustible and/or carbonaceous particulate matter (soot), and un-reacted oxygen and nitrogen.

A "carrier" of catalytic material is a structure that is suitable for withstanding conditions encountered in exhaust streams of combustion engines. A carrier is a ceramic or metal honeycomb structure having fine, parallel gas flow passages extending from one end of the carrier to the other. The passages may be flow through or they may be alternately blocked as wall-flow filter substrates.

Catalyst Material

TWC catalysts that exhibit good activity and longevity comprise one or more platinum group metals (e.g., platinum, palladium, rhodium, rhenium and iridium) disposed on a high surface area refractory metal oxide component or support, e.g., a high surface area alumina. The support is coated on a suitable carrier or substrate such as a monolithic carrier comprising a refractory ceramic or metal honeycomb structure; or refractory particles such as spheres or short, extruded segments of a suitable refractory material. The refractory metal oxide components or supports may be stabilized against thermal degradation by materials such as zirconia, titania, alkaline earth metal oxides such as baria, calcia or strontia or, most usually, rare earth metal oxides, for example, ceria, lanthana and mixtures of two or more rare earth metal oxides. For example, see U.S. Pat. No. 4,171,288 (Keith), which is hereby incorporated in its entirety. TWC catalysts can be formulated to include an oxygen storage component (OSC) (e.g., ceria and/or praseodymia).

The present disclosure provides a catalyst material comprising a rhodium component impregnated on a support material, wherein the support material is a composite material comprising zirconia doped with baria, alumina, or combinations thereof. In various embodiments, the zirconia-based support material comprises zirconia in an amount from about 80 to about 99 wt. %. In some embodiments, the catalyst material can comprise a rhodium-containing layer (the "top layer" or the "second layer") and a palladium (Pd)-containing layer (the "bottom layer" or the "first layer"), as described in more detail below.

One or more of the platinum group metals (PGMs) present in any washcoat layer are fixed to their individual support, which means that the PGM is not soluble in the washcoat dispersion. Fixing of PGMs can occur by chemical or thermal fixation. For thermal fixing, to produce a "thermally-fixed" PGM, it is meant that the impregnated supports are treated with heat such that the PGMs are converted to their oxide forms and that upon use of the thermally-fixed PGMs on supports in an aqueous slurry, the PGMs are not soluble and do not alloy/agglomerate. For chemical fixation, the pH or some other parameter of the dispersion of the PGM salt with support is changed to render the PGM insoluble in the washcoat dispersion. Without intending to be bound by theory, it is thought that the thermally-fixed PGM contained in the homogeneously mixed two-metal layer minimizes migration of the PGMs, especially the rhodium.

Reference to a "support" in a catalyst washcoat layer refers to a material that receives PGMs, stabilizers, promoters, binders, and the like through association, dispersion, impregnation, or other suitable methods. Examples of supports include, but are not limited to, high surface area refractory metal oxides and composites containing oxygen storage components. Exemplary support materials are high surface area aluminum oxide (>80, 90, 100, 125, or even 150 $m^2/g$) (in various modifications), zirconium oxide components that can be combined with stabilizers such as lanthana (i.e., Zr—La composites), and oxygen storage components (i.e. cerium-zirconium mixed oxides in various embodiments). Exemplary high surface area refractory metal oxides can comprise a stabilized alumina and/or an activated alumina compound selected from the group consisting of alumina, lanthana-alumina, baria-alumina, ceria-alumina, zirconia-stabilized alumina, zirconia-alumina, ceria-zirconia-alumina, lanthana-zirconia-alumina, baria-lanthana-alumina, baria-lanthana-neodymia alumina, and combinations thereof. Zirconia-based supports may be selected from the group consisting of zirconia, lanthana-zirconia, titania-zirconia, titania-lanthana-zirconia, and combinations thereof.

Reference to "oxygen storage component" (OSC) refers to an entity that has a multi-valence state and can actively react with oxidants such as oxygen or nitrous oxides under oxidative conditions, or reacts with reductants such as carbon monoxide (CO) or hydrogen under reduction conditions. Typically, the OSC will comprise one or more reducible oxides of one or more rare earth metals. Examples of suitable oxygen storage components include ceria, praseodymia, or combinations thereof. Delivery of ceria into the layer can be achieved by the use of, for example, ceria, a mixed oxide of cerium and zirconium, and/or a mixed oxide of cerium, zirconium, yttrium, lanthanum, or optionally neodymium.

High surface refractory metal oxide components or supports refer to support particles having pores larger than 20 Å and a wide pore distribution. High surface area refractory metal oxide supports, e.g., alumina support materials, also referred to as "gamma alumina" or "activated alumina," typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Refractory metal oxides other than activated alumina can also be used as supports for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst.

As described above, catalyst materials described herein can include at least one catalyst composition comprising a rhodium component impregnated on a support material, wherein the support material is a composite material comprising zirconia doped with baria, alumina, or combinations thereof, wherein the zirconia-based support material comprises zirconia in an amount from about 80 to about 99 wt. %.

Rhodium needs to be maintained in its metallic state ($Rh^0$) to maintain its activity for NOx reduction. Deactivation modes for rhodium include metal and/or support sintering, metal and/or support oxidation, and metal-support interactions. See, e.g., Catalysts 2015, 5, 1770-1796, which is herein incorporated by reference. It is widely accepted that the interaction between Rh and $\gamma$-$Al_2O_3$ during thermal oxidative exposure leads to the formation of stable and inactive rhodium aluminate $Rh(AlO_2)y$. However, disadvantages still remain when $Al_2O_3$ is used as Rh support for NOx reduction purpose. It was surprisingly discovered that modified $ZrO_2$-based support materials described herein can be used as Rh supports in three-way conversion (TWC) catalysts because they can offer high NOx removal efficiency due to the easy regeneration of Rh active sites under lean-rich reaction conditions, and surprisingly provide higher hydrothermal stability than $ZrO_2$ materials that have not been modified as described herein.

In various embodiments of the present invention, about 0.1 to about 25 wt. %, about 0.5 to about 20 wt. %, or about 1 to about 15 wt. % of a dopant (e.g., $La_2O_3$, BaO, SrO, $Al_2O_3$, $Nb_2O_5$) can be doped into $ZrO_2$ support materials either by an incipient wetness impregnation method or a co-precipitation method. Without being limited by theory, it is noted that the dopants loaded onto $ZrO_2$ support materials by impregnation methods are mainly present on the surface of the $ZrO_2$ molecules, whereas the dopants loaded onto $ZrO_2$ materials by co-precipitation methods are more homogeneously distributed in the $ZrO_2$ matrix. Dopant precursors can be used in the doping processes. For example, the dopant precursors can be nitrates, acetates, chlorides, oxalates, etc. After dopant impregnation (in which the solution containing dopant precursors is impregnated onto $ZrO_2$) or co-precipitation (in which the solution containing dopant precursors and $ZrO_2$ precursor is precipitated out using a precipitator such as $NH_3$, urea, or other alkaline agents), the resulting $ZrO_2$ materials can be calcined at about 500-600° C. (e.g., at about 550° C.) for about 1-5 hours (e.g., about 2 hours). After calcining the $ZrO_2$-based support material, Rh (e.g., in the form of rhodium nitrate) can be impregnated onto these doped $ZrO_2$-based support materials. Following impregnation of the Rh, the Rh-impregnated $ZrO_2$-based support materials can be calcined again at about 500-600° C. (e.g., at about 550° C.) for about 1-5 hours (e.g., about 2 hours).

It was surprisingly discovered that even though the Rh/BaO—$ZrO_2$ and Rh/$Al_2O_3$—$ZrO_2$ catalysts can have much smaller surface areas than reference comparative catalysts (e.g., Rh/$La_2O_3$—$ZrO_2$), the Rh dispersion on BaO- and $Al_2O_3$-doped $ZrO_2$ materials is actually higher than that on comparative reference materials (see, Example 2 below). Without being limited by theory, it is believed this can be an important reason for the enhanced TWC performance provided by the use of the $ZrO_2$-based support materials described herein.

As can be seen from the Examples below, $ZrO_2$-based support materials with various effective dopants such as BaO and $Al_2O_3$, can be effectively used as Rh supports for TWC application. By using these novel supports, the reducibility of RhOx species can be significantly promoted and/or the Rh dispersion can be improved even after severe aging at high temperatures.

In some embodiments, the support material is baria-doped zirconia, and the barium is present in an amount ranging from about 0.5 to about 20 wt. %, or about 1 to about 15 wt. %, or about 5 to about 10 wt. %, based on the total weight of the support material. In various embodiments, the support material is alumina-doped zirconia, and the aluminum is present in an amount ranging from about 0.5 to about 10 wt. %, or about 1 to about 8 wt. %, or about 1 to about 5 wt. % based on the total weight of the support material. In some embodiments, the zirconia-based support material (baria-doped zirconia or alumina-doped zirconia) is co-doped with at least one of $La_2O_3$, $Y_2O_3$, $Nd_2O_3$, and $Pr_6O_{11}$.

In various embodiments of the present invention, the rhodium component present in the second layer is present in an amount ranging from about 0.01% to about 10 wt. %, or about 0.05 to about 3.0 wt. %, based on the total weight of the Rh-containing layer.

In some embodiments, the Rh-containing second layer is a Rh-only layer, that is, there are no other PGMs present in the layer. However, in other embodiments, a palladium component is also present in the Rh-containing layer. The Pd in the Rh-containing layer can be in the range of about 5-60 wt. %, or about 10-40 wt. % of all of the palladium present in the catalyst material.

In certain embodiments, the Pd and Rh in the second layer are on individual support materials. The choice of support materials for Pd and Rh can also improves the accessibility of the exhaust gas to the Rh and optional Pd metals in the second layer. For example, NOx conversion may be enhanced by supporting Pd on a particular oxygen storage component (OSC) in the second layer. HC light off temperature may be enhanced by the use of Pd/alumina or different combinations of alumina and OSC in one of the layers. For example, different Pd and Rh support materials could be used depending on the exhaust gas (NOx, HC, or CO) that needs to be reduced. As described above, the Rh in the top layer may be supported on $ZrO_2$-based support materials of the present invention. In certain embodiments of the present invention, the second layer comprises a palladium component impregnated on ceria-zirconia and/or lanthana-alumina.

Catalyst materials described herein can further include at least one additional catalyst composition comprising platinum group metal (PGM) component impregnated on a porous support material. In some embodiments, the PGM component is a palladium component. In various embodiments, the additional catalyst composition is a first layer of the catalyst materials described herein. In various embodiments, all of the palladium present in the catalytic material is present in the first layer (i.e., the second layer is substantially free of palladium). In some embodiments, the first layer and the second layer each comprise a palladium component. In various embodiments, at least a portion of the porous support material comprises an oxygen storage component selected from ceria, zirconia, lanthana, yttria, neodymia, praseodymia, niobia, and combinations thereof. In certain embodiments, the oxygen storage component is ceria-zirconia, comprising ceria in an amount from about 5 to about 75 wt. %, based on the total weight of the oxygen storage component. In some embodiments, at least a portion of the porous support material is a refractory metal oxide support selected from alumina, lanthana-alumina, ceria-alumina, zirconia-alumina, ceria-zirconia-alumina, lanthana-zirconia-alumina, lanthana-neodymia-alumina, and combinations thereof.

In one or more embodiments, the Pd-containing (first) layer is a Pd-only layer, that is, there are no other platinum group metals (PGMs) present in the layer. However, in other embodiments, a platinum component is also present in the Pd-containing (first) layer.

In various embodiments of the present invention, the second layer (often configured as the top layer) of the catalyst material is a catalyst composition comprising a rhodium component The catalytic layers of the catalytic materials disclosed herein may also contain stabilizers and promoters, as desired. Suitable stabilizers include one or more non-reducible metal oxides wherein the metal is selected from the group consisting of barium, calcium, magnesium, strontium and mixtures thereof. Preferably, the stabilizer, where present, comprises one or more oxides of barium and/or strontium. Suitable promoters include one or more non-reducible oxides of one or more rare earth metals selected from the group consisting of lanthanum, praseodymium, yttrium, zirconium and mixtures thereof. For example, in various embodiments, the first and/or second layer further comprises barium oxide, magnesium oxide, calcium oxide, strontium oxide, lanthanum oxide, cerium oxide, zirconium oxide, manganese oxide, copper oxide, iron oxide, praseodymium oxide, yttrium oxide, neodymium oxide, or any combination thereof.

Method of Making the Catalyst Compositions

In general, methods of preparing the layers of the catalyst materials disclosed herein include preparation of individual metal compositions that are fixed (e.g., thermally-fixed) and optionally well-dispersed. As such, individual platinum group metals (PGMs), such as platinum (Pt), palladium (Pd), rhodium (Rh), iridium (Ir), and/or ruthenium (Ru), are applied, e.g., as nitrate solutions by impregnation to separate support materials to achieve good dispersion. PGM component precursors are generally salts of PGM components and are typically dissolved in a solvent to form a PGM component precursor solution. Exemplary palladium component precursors include, but are not limited to, palladium nitrate, palladium tetra amine, palladium acetate, or combinations thereof. That is, the solutions are diluted to the highest possible amount while delivering the desired metal loading. The individual diluted solutions are then added to the individual support materials by incipient wetness to form impregnated supports. The impregnated supports are then subsequently fired (thermally-fixed) before the aqueous washcoat dispersion is produced. Firing of the impregnated support materials leads to conversion of, e.g., palladium nitrate and rhodium nitrate into the corresponding oxides. Without intending to be bound by theory, it is thought that the oxides are insoluble in water, which helps to prevent palladium and rhodium from redissolving. The probability of palladium-rhodium alloy formation is thus decreased, although the two PGMs are present in the same layer.

Preparation of the second rhodium-containing catalyst layer generally involves combining a $ZrO_2$-based support material with a rhodium component precursor so as to impregnate at least the rhodium component on the support material. Rhodium component precursors are generally salts of the rhodium component and are typically dissolved in a solvent to form a rhodium component precursor solution. Exemplary rhodium component precursors include, but are not limited to, rhodium chloride, rhodium nitrate (e.g., Ru(NO)$_3$ and salts thereof), rhodium acetate, or combinations thereof.

The above referenced impregnation steps can be conducted, e.g., using an incipient wetness technique. Incipient wetness impregnation techniques, also called capillary impregnation or dry impregnation, are commonly used for the synthesis of heterogeneous materials, i.e., catalysts. Typically, a precursor is dissolved in an aqueous or organic solution and then the resulting solution is added to a catalyst support containing the same pore volume as the volume of the solution that was added. Capillary action draws the solution into the pores of the support. Solution added in excess of the support pore volume causes the solution transport to change from a capillary action process to a diffusion process, which is much slower. The support material, e.g., in particulate from, is typically dry enough to adsorb substantially all of the solution to form a moist solid. The catalyst can then be dried and calcined to remove the volatile components within the solution, depositing the rhodium component, for example, on the surface of the support material. The concentration profile of the impregnated material depends on the mass transfer conditions within the pores during impregnation and drying.

Following treatment of the support material with the active metal solution, the material is dried, such as by heat treating the material at elevated temperature (e.g., 100-150° C.) for a period of time (e.g., 1-3 hours), and then calcined to convert the active metal to a more catalytically active form. An exemplary calcination process involves heat treatment in air at a temperature of about 400-550° C. for 10 min to 3 hours.

The above process can be repeated as needed to reach the desired level of metal impregnation. The impregnated supports can be mixed with other components by conventional methods.

Carrier

In one or more embodiments, the disclosed catalyst material is disposed on a carrier. The carrier may be any of those materials typically used for preparing catalysts, and will preferably comprise a ceramic or metal honeycomb structure. Any suitable carrier may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e., cells) per square inch of cross section.

The carrier can also be a wall-flow filter substrate, where the channels are alternately blocked, allowing a gaseous stream entering the channels from one direction (inlet direction), to flow through the channel walls and exit from the channels from the other direction (outlet direction). A dual oxidation catalyst composition can be coated on the wall-flow filter. If such a carrier is utilized, the resulting system will be able to remove particulate matters along with gaseous pollutants. The wall-flow filter can be made from materials commonly known in the art, such as cordierite or silicon carbide.

Figure 2B:
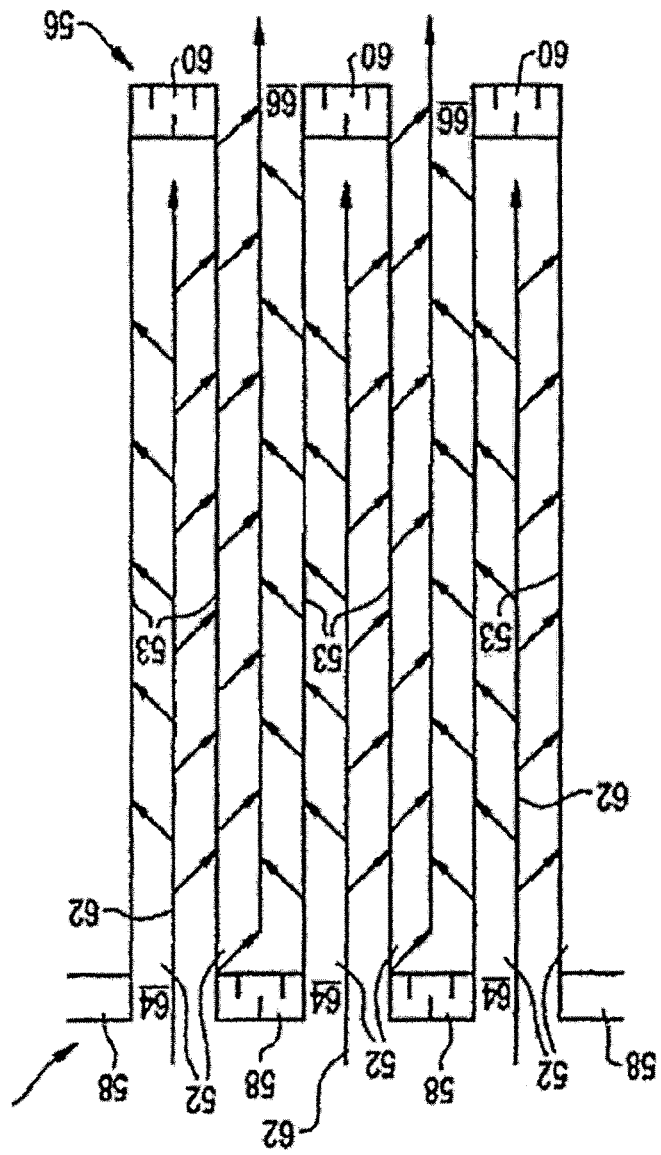
FIG. 2B is a cut-away view of a section of a wall flow filter substrate.

FIGS. 2A and 2B are different views of a wall flow filter substrate 50 which has a plurality of passages 52. The passages are tubularly enclosed by the internal walls 53 of the filter substrate. The substrate has an inlet end 54 and an outlet end 56. Alternate passages are plugged at the inlet end with inlet plugs 58 and at the outlet end with outlet plugs 60 to form opposing checkerboard patterns at the inlet 54 and outlet 56. A gas stream 62 enters through the unplugged inlet channels 64, is stopped by outlet plug 60 and diffuses through channel walls 53 (which are porous) to the outlet channels 66. The gas cannot pass back to the inlet side of walls because of inlet plugs 58.

In an exemplary embodiment, inlet channels 64 have a layer containing Pd as the only PGM coated thereon. The Pd is supported on an OSC and/or a refractory metal oxide support. This layer may be homogeneous or zoned. The washcoat loading may be in the range of about 1-2.5 g/in$^3$. The OSC loading may be about 50-80% of total washcoat loading. Outlet channels 66 have a Pd/Rh layer (homogeneous or zoned) with a washcoat loading in the range of about 0.5-1.5 g/in$^3$. Layer compositions and zoning configurations may be according to any of the designs disclosed herein.

Figure 2D:
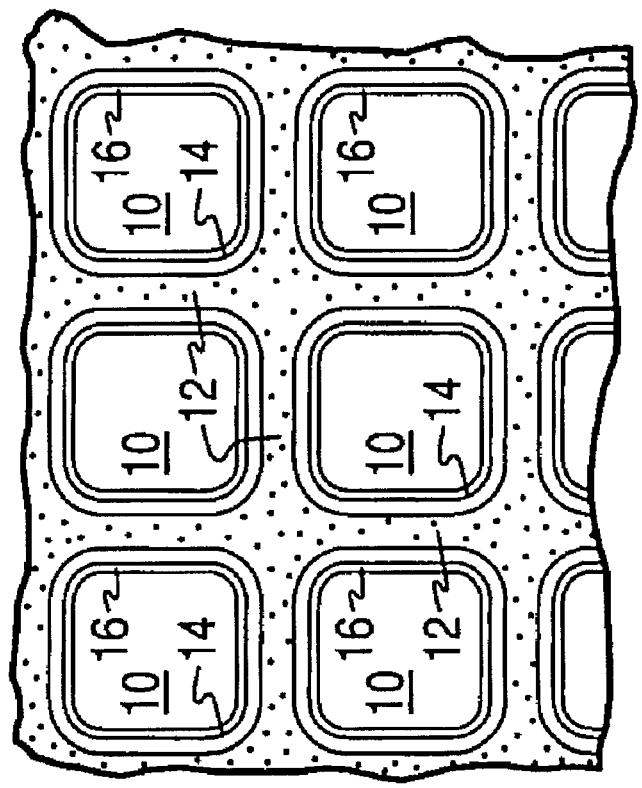
FIG. 2D is a partial cross-sectional view enlarged relative to FIG. 2C and taken along a plane parallel to the end faces of the carrier of FIG. 2C, which shows an enlarged view of a plurality of the gas flow passages shown in FIG. 2C.
Figure 2C:
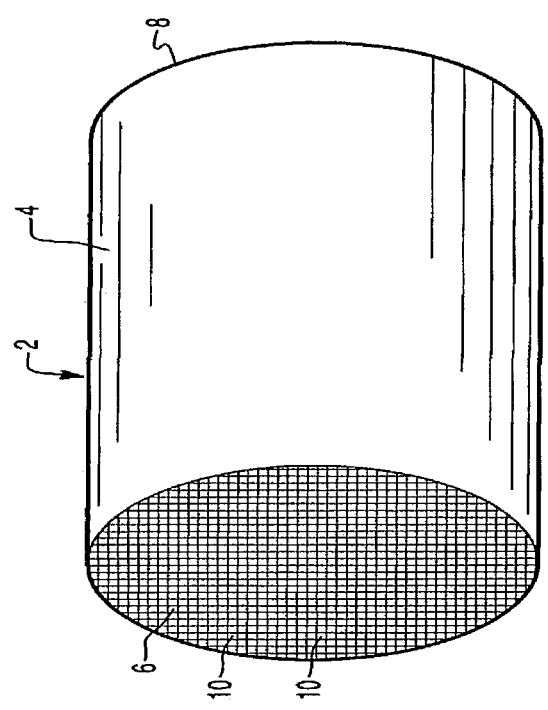
FIG. 2C is a perspective view of a honeycomb-type substrate which may comprise a catalyst washcoat composition in accordance with the present invention.

FIGS. 2C and 2D illustrate an exemplary substrate 2 in the form of a flow-through substrate coated with a washcoat composition as described herein. Referring to FIG. 2C, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 2D, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2D, walls 12 are so dimensioned and configured that gas flow passages 10 have a substantially regular polygonal shape. As shown, the washcoat composition can be applied in multiple, distinct layers if desired. In the illustrated embodiment, the washcoat consists of both a discrete bottom washcoat layer 14 adhered to the walls 12 of the carrier member and a second discrete top washcoat layer 16 coated over the bottom washcoat layer 14. The present invention can be practiced with one or more (e.g., 2, 3, or 4) washcoat layers and is not limited to the two-layer embodiment illustrated in FIG. 2D.

Ceramic carriers may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like.

Carriers useful for the catalysts of the present disclosure may also be metallic in nature and be composed of one or more metals or metal alloys. The metallic carriers may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least about 15 wt. % of the alloy, e.g., about 10-25 wt. % of chromium, about 3-8 wt. % of aluminum and up to about 20 wt. % of nickel. The alloys may also contain small or trace amounts of one or more other metals such as manganese, copper, vanadium, titanium and the like. The surface of the metal carriers may be oxidized at high temperatures, e.g., about 1000° C. and higher, to improve the resistance to corrosion of the alloys by forming an oxide layer on the surfaces of the carriers. Such high temperature-induced oxidation may enhance the adherence of the refractory metal oxide support and catalytically promoting metal components to the carrier.

In describing the quantity of washcoat or catalytic metal components or other components of the composition, it is convenient to use units of weight of component per unit volume of catalyst carrier (also referred to as a substrate). Therefore, the units, grams per cubic inch ("g/in$^3$") and grams per cubic foot ("g/ft$^3$") are used herein to mean the weight of a component per volume of the substrate, including the volume of void spaces of the carrier. Other units of weight per volume such as g/L are also sometimes used. The total loading of the catalyst composition on the carrier, such as a monolithic flow-through carrier, is typically from about 0.5 to about 6 g/in$^3$, and more typically from about 1 to about 5 g/in$^3$. Total loading of the PGM component without support material (e.g., the Pd alone or in combination with Rh) is typically in the range of about 30 to about 200 g/ft$^3$ for each individual carrier.

In alternative embodiments, one or more catalyst compositions may be deposited on an open cell foam substrate. Such substrates are well known in the art, and are typically formed of refractory ceramic or metallic materials.

Catalytic Article

As illustrated in FIG. 1, for example, catalyst articles are provided herein, the catalyst articles comprising: a catalytic material on a carrier, the catalytic material comprising at least two layers: the first layer as disclosed herein (typically present as the bottom layer) deposited directly on the carrier comprising a first palladium component supported on a first refractory metal oxide component, a first oxygen storage component, or a combination thereof, the second layer disclosed herein (typically present as the top layer) deposited on top of the first layer comprising a rhodium component supported on a ZrO$_2$-based support component and an optional second palladium component supported on a second oxygen storage component, a second refractory metal oxide component or a combination thereof, wherein the catalytic material is effective for carrying out three-way conversion (TWC).

Figure 4:
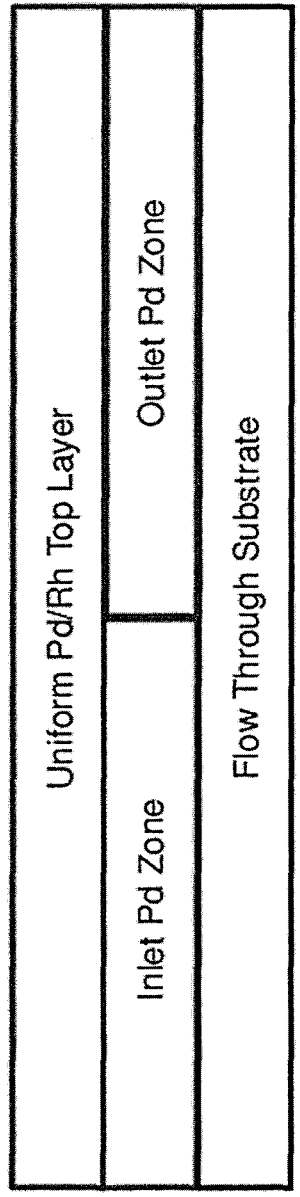
FIG. 4 is an exemplary catalyst composite showing a zoned first layer on a flow through substrate.

FIG. 4 is an exemplary catalyst composite showing a substantially uniform Pd—Rh top layer disposed on top of a zoned Pd-only bottom layer, which is coated on a flow through substrate. In this embodiment, the Pd-only bottom layer is zoned to have an "Inlet Pd Zone" and an "Outlet Pd Zone," wherein the majority of the palladium amount is present in the front/inlet Pd zone. In the bottom layer, the PGM is Pd exclusively. In some embodiment, the Pd present in the inlet zone of this layer is about 60-90% of the total Pd in the bottom layer. The Pd present in the outlet zone of this layer is about 10-40% of the total Pd in the bottom layer.

In some embodiments, Pd is available for the inlet zone. In additional embodiments, such Pd in the inlet zone comprises Pd on an OSC in amount of about 30-70% of the total Pd available for the inlet zone (remaining Pd is on the refractory alumina based support) and Pd on a refractory metal oxide. In certain such embodiments, the composition of the Pd support materials (alumina and an OSC) in both zones is the same. Washcoat loading of the bottom layer is about 1.5-4 g/in$^3$, preferably about 2-3 g/in$^3$. The total amount of the OSC in the inlet zone is about 50-80% of total dry weight. Length of the inlet zone is about 25-75% of the total length of the carrier. The substantially uniform/homogenous Pd/Rh top layer is designed as needed to meet the needs of a particular application.

Figure 5:
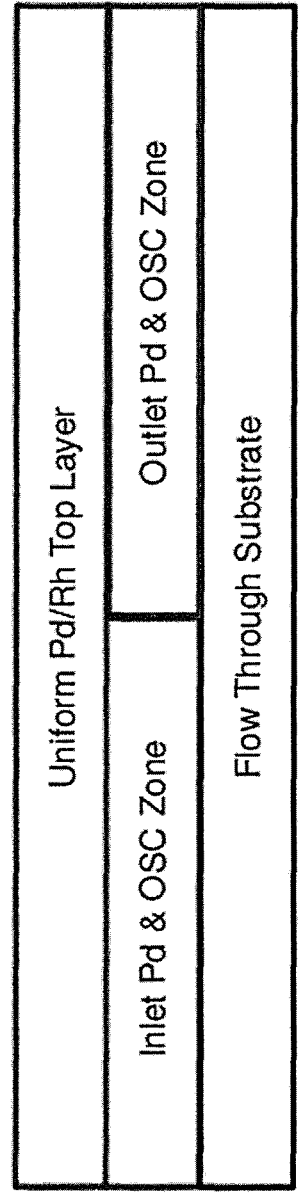
FIG. 5 is another exemplary catalyst composite showing a zoned first layer on a flow through substrate.

FIG. 5 is another exemplary catalyst composite showing a substantially uniform Pd—Rh top layer disposed on top of a zoned bottom layer, which is coated onto a flow through substrate. In this embodiment, the Pd-only bottom layer is zoned to have a majority of palladium in the Pd-only bottom layer in the front/inlet zone, wherein an OSC is present in both zones. Pd present in the inlet zone is about 60-90% of the total Pd available in the bottom layer and the OSC in the inlet zone is about 20-80% of total available OSC present in the bottom layer. In such embodiments, the Pd on the OSC in the inlet zone is greater than (e.g., about twice) the amount of Pd on the OSC in the outlet zone. The amount of Pd in the OSC in the outlet zone is about 10-40% of Pd available for the bottom layer. The amount of an OSC in the outlet zone is about 20-80% of total amount of the available OSC available in the bottom layer. Both the inlet and outlet zones in the embodiment shown in FIG. 5 further comprise Pd supported on a refractory metal oxide support. The washcoat loading of the bottom layer is about 1.5-4 g/in$^3$, preferably about 2-3 g/in$^3$. The length of the bottom layer inlet zone is generally about 25-75% of the total length of the substrate. The substantially uniform/homogenous Pd/Rh top layer is designed as needed to meet the needs of a particular application.

Figure 6:
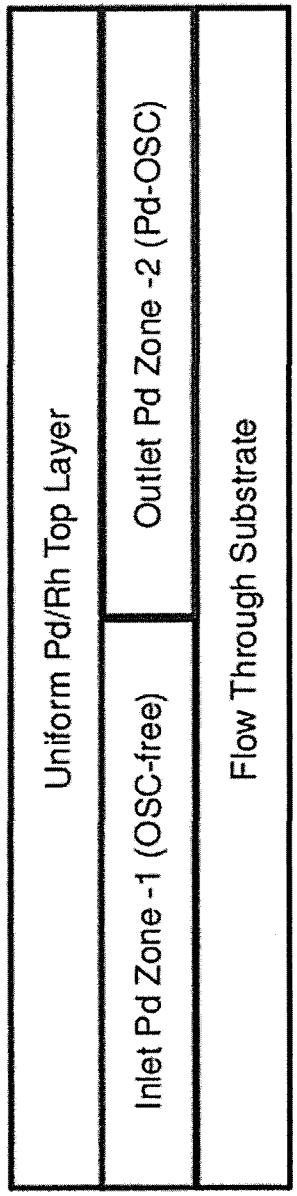
FIG. 6 is another exemplary catalyst composite showing a zoned first layer on a flow through substrate.

FIG. 6 is another exemplary catalyst composite showing a zoned first layer on a flow through substrate. In this embodiment, the inlet zone of the Pd-only layer is substantially OSC free. The Pd in the inlet zone is about 40-80% of the total Pd available in the bottom layer and the amount of OSC in the inlet zone is about zero (i.e., this zone is substantially OSC-free). The outlet zone comprises Pd on an OSC, wherein the Pd in the outlet zone is about 20-60% of the total Pd available in the bottom layer. In the outlet zone, the OSC washcoat loading is about 80-100% of the total washcoat. The outlet zone may comprise about 100% of the OSC in the layer; binders and optionally other ingredients can be added. The washcoat loading of the inlet zone is about 0.5-2.5 g/in$^3$, preferably about 1-2 g/in$^3$. The washcoat loading of the outlet zone is about 1.0-3.5 g/in$^3$, preferably about 2-3 g/in$^3$. The length of the bottom layer inlet zone is about 25-75% of the total substrate length. The substantially uniform/homogenous Pd/Rh top layer is designed as needed to meet the needs of a particular application.

Figure 7:
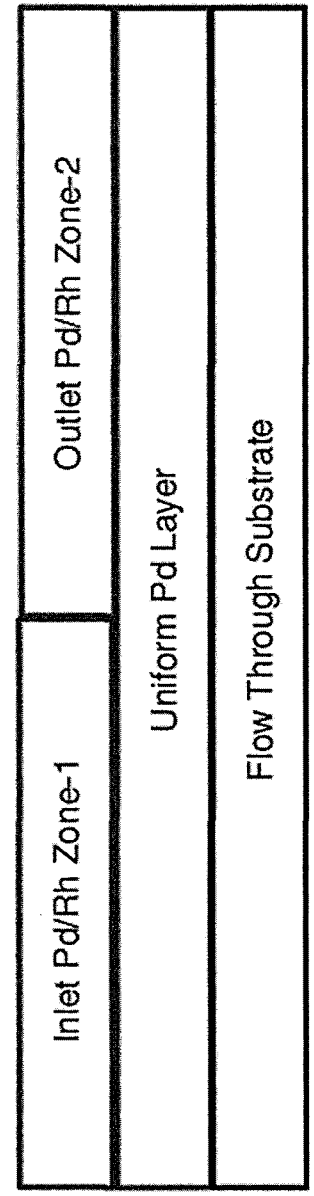
FIG. 7 is an exemplary catalyst composite showing a zoned second layer on a first layer, which is on a flow through substrate.

FIG. 7 is an exemplary catalyst composite showing a zoned top layer disposed on a bottom layer, which is coated on a flow through substrate. In this embodiment, the Pd/Rh top layer is zoned. The Pd present in the substantially uniform bottom layer is about 30-90% of Pd available for the bottom layer; preferably the Pd present in the bottom layer is about 60-90%. The amounts of Pd and Rh in the inlet zone are as follows: Pd is about 60-100% of total Pd available for the top layer and Rh is about 0-80% of total Rh available. The washcoat loading of the inlet zone is about 0.75-1.5 g/in$^3$. The Pd support of the inlet zone of the top layer can be stabilized alumina, OSC, La—ZrO$_2$, Pr—CeO$_2$, and the like. Rh supports can include modified ZrO$_2$-based support materials described herein. The amounts of Pd and Rh in the outlet zone of the top layer are as follows: Pd is about 0-40% of available Pd for top layer and Rh is about 20-80% of Rh available. Washcoat loading of the outlet zone can be about 0.75-1.5 g/in$^3$. The Pd support of the outlet zone of the top layer can be stabilized alumina, OSC, La—ZrO$_2$, Pr—CeO$_2$, and the like. Rh supports are modified $ZrO_2$-based support materials described herein. The length of the top layer inlet zone is about 25-75% of the total length of the substrate.

Figure 8:
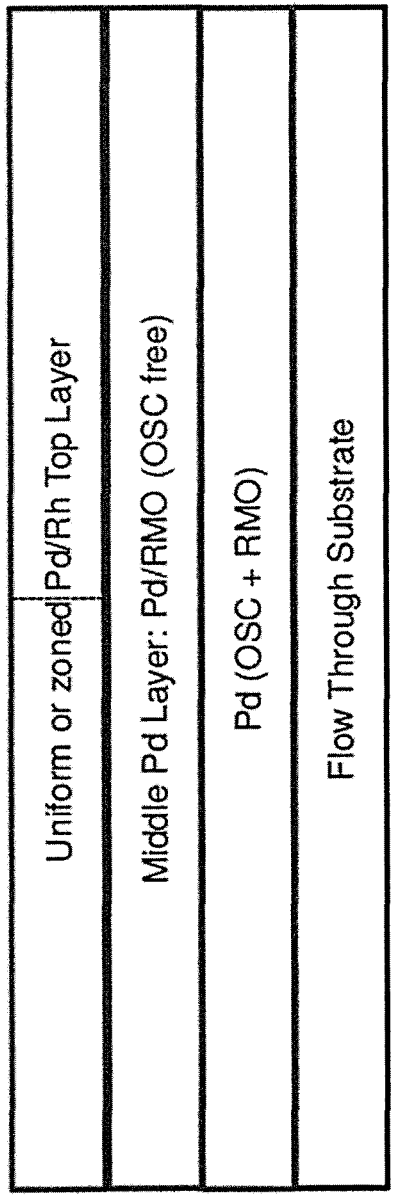
FIG. 8 is an exemplary catalyst composite having a middle palladium-containing layer between the first layer and the second layer.

FIG. 8 is an exemplary catalyst composite having a middle palladium-containing layer between the bottom layer and the top layer. In this embodiment, Pd is provided in two layers to maximize cold start HC and NOx conversion efficiency. The Pd-containing bottom layer has the following features: Pd is about 10-40% of the total Pd of the bottom layer about 80-100% of the Pd is on an OSC; about 0-20% of Pd is on a refractory metal oxide support; the total washcoat loading is about 1-2 $g/in^3$; the OSC loading is about 80-100% of the total washcoat; the refractory metal oxide loading is about 0-20%; and the coating is substantially uniform. The middle Pd layer has the following features: Pd is about 40-80% of Pd available; about 100% of the amount of Pd is on refractory metal oxides; the total washcoat loading is about 0.5-2 $g/in^3$, preferably about 1-1.5 $g/in^3$; an OSC substantially free layer; and the coating is substantially uniform. The uniform/homogenous or zoned Pd/Rh top layer is designed as needed to meet the needs of a particular application.

Figure 9:
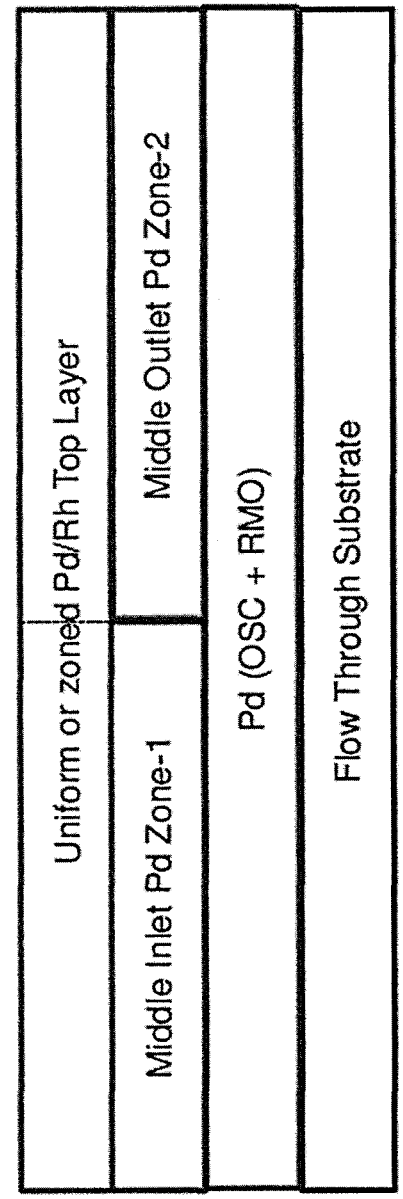
FIG. 9 is an exemplary catalyst composite having a zoned middle palladium-containing layer between the first layer and the second layer.

FIG. 9 is an exemplary catalyst composite having a zoned middle palladium-containing layer between the bottom layer and the top layer. The Pd-containing bottom layer has the following features: Pd is about 10-40% of Pd available; about 80-100% of Pd is on an OSC; about 0-20% of Pd is on refractory metal oxides; the total washcoat loading is about 1-2 $g/in^3$; the OSC loading is about 80-100% of the total wash coat; refractory metal oxide loading is about 0-20%; and the coating is substantially uniform. The zoned middle Pd-containing layer has the following features: Pd is about 40-80% of Pd available; about 100% of Pd is on refractory metal oxide; the total wash coat loading is about 0.5-2 $g/in^3$, preferably about 1-1.5 $g/in^3$; OSC substantially free layer; inlet zone has Pd in an amount of about 60-80% of the amount of Pd available for the middle layer and the outlet zone has an amount of Pd of about 20-40% of the total amount Pd available for the middle layer.

In some embodiments, such an automotive catalyst article further comprises an undercoat layer located between the carrier and the top layer, wherein the undercoat layer is substantially free of any PGMs and comprises alumina. In some embodiments, the automotive catalyst composite further comprises a middle palladium-containing layer between the top layer and the bottom layer. In some examples, the middle layer comprises a palladium component supported on a refractory metal oxide component. In some embodiments, the middle palladium-containing layer is substantially free of an oxygen storage component.

Carrier Coating Process

The catalyst compositions, typically prepared in the form of catalyst particles as noted above, can be mixed with water to form a slurry for purposes of coating a catalyst carrier, such as a honeycomb-type carrier. In addition to the catalyst particles, the slurry may optionally contain a binder in the form of alumina, silica, zirconium acetate, colloidal zirconia, or zirconium hydroxide, associative thickeners, and/or surfactants (including anionic, cationic, non-ionic or amphoteric surfactants). Other exemplary binders include boehmite, gamma-alumina, or delta/theta alumina, as well as silica sol. When present, the binder is typically used in an amount of about 1-5 wt. % of the total washcoat loading. Addition of acidic or basic species to the slurry can be carried out to adjust the pH accordingly. For example, in some embodiments, the pH of the slurry is adjusted by the addition of ammonium hydroxide, aqueous nitric acid, or acetic acid. A typical pH range for the slurry is about 3 to 12.

The slurry can be milled to reduce the particle size and enhance particle mixing. The milling can be accomplished in a ball mill, continuous mill, or other similar equipment, and the solids content of the slurry may be, e.g., about 20-60 wt. %, more particularly about 20-40 wt. %. In one embodiment, the post-milling slurry is characterized by a D90 particle size of about 10 to about 40 microns, preferably 10 to about 30 microns, more preferably about 10 to about 15 microns. The D90 is determined using a dedicated particle size analyzer. The equipment employed in this example uses laser diffraction to measure particle sizes in small volume slurry. The D90, typically with units of microns, means 90% of the particles by number have a diameter less than that value.

The slurry is coated on the catalyst carrier using any washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period of time (e.g., 10 min-3 hours) and then calcined by heating, e.g., at 400-600° C., typically for about 10 minutes to about 3 hours. Following drying and calcining, the final washcoat coating layer can be viewed as essentially solvent-free.

Method of Hydrocarbon (HC), Carbon Monoxide (CO), and Nitrogen Oxides ($NO_x$) Conversion In general, hydrocarbons, carbon monoxide, and nitrogen oxides present in the exhaust gas stream of a gasoline or diesel engine can be converted to carbon dioxide, nitrogen, and water according to the equations shown below:

$$2CO+O_2 \rightarrow 2CO_2$$

$$C_xH_y+(x+y/2)O_2 \rightarrow xCO_2+yH_2O$$

$$2NO+2CO \rightarrow N_2+2CO_2$$

$$2NO+2H_2 \rightarrow N_2+2H_2O$$

$$NO+C_xH_y \rightarrow N_2+H_2O+CO_2$$

Typically, hydrocarbons present in an engine exhaust gas stream comprise $C_1$-$C_6$ hydrocarbons (i.e., lower hydrocarbons), although higher hydrocarbons (greater than $C_6$) can also be detected.

The disclosed catalytic article can at least partially convert HC, CO, and $NO_x$ in an exhaust gas stream. As such, methods herein generally comprise contacting the gas stream with a catalytic article as described herein. In some embodiment, the catalytic article converts hydrocarbons to carbon dioxide and water. In some embodiments, the catalytic article converts at least about 60%, at least about 70%, at least about 75%, at least about 80%, at least about 90%, or at least about 95% of the amount of hydrocarbons present in the exhaust gas stream prior to contact with the catalytic article. In some embodiments, the catalytic article converts carbon monoxide to carbon dioxide. In some embodiments, the catalytic article converts at least about 60%, at least about 70%, at least about 75%, at least about 80%, at least about 90%, or at least about 95% of the amount of carbon monoxide present in the exhaust gas stream prior to contact with the catalytic article. In some embodiment, the catalytic article converts nitrogen oxides to nitrogen. In some embodiments, the catalytic article converts at least about 60%, at least about 70%, at least about 75%, at least about 80%, at least about 90%, or at least about 95% of the amount of nitrogen oxides present in the exhaust gas stream prior to contact with the catalytic article. In some embodiment, the catalytic article converts at least about 50%, at least about 60%, at least about 70%, at least about 80%, at least about 90%, or at least about 95% of the total amount of hydrocarbons, carbon dioxide, and nitrogen oxides combined present in the exhaust gas stream prior to contact with the catalytic article.

In the methods described herein, the catalytic article of the disclosure reduces $NO_x$, CO, and HC levels to levels that are lower than those provided by a comparative catalytic article comprising the same catalytic material at the same loading, but wherein the Rh is supported on a support other than the $ZrO_2$-based support component described herein. In some embodiments, the disclosed catalytic article reduces $NO_x$, CO, and HC levels in the gas stream to levels that are about 5% to about 75%, about 10% to about 70%, or about 15% to about 50% lower than those provided by catalytic articles comprising the same catalytic material at the same loading, but wherein the Rh is supported on a support other than the $ZrO_2$-based support component described herein. For example, in some embodiments, the method provides catalytic articles capable of reducing $NO_x$, CO, and HC levels in a gas stream to levels that are least about 5%, at least about 10%, at least about 15%, at least about 20%, at least about 25%, at least about 30%, at least about 35%, at least about 40%, at least about 45%, at least about 50%, at least about 60%, or at least about 70% lower than the levels provided by a comparative catalytic article, with an upper boundary of 75%.

In some embodiments, the catalytic article of the invention reduces the $NO_x$ level in the gas stream to a level that is about 5% to about 50%, about 10% to about 40%, or about 10% to about 30% lower than that provided by a comparative catalytic article. For example, in some embodiments, the method provides catalytic articles capable of reducing the level of $NO_x$ levels in a gas stream to a level that is at least 5%, at least about 10%, at least about 15%, at least about 20%, at least about 25%, at least about 30%, at least about 35%, at least about 40%, or at least about 45% lower than that provided by a comparative catalytic article, with an upper boundary of about 50%. In some embodiments, the catalytic article of the invention reduces the HC level in a gas stream to a level that is about 5% to about 50%, about 10% to about 40%, or about 10% to about 30% lower than that provided by a comparative catalytic article. For example, in some embodiments, the method provides catalytic articles reducing the HC level in a gas stream to a level that is at least 5%, at least about 10%, at least about 15%, at least about 20%, at least about 25%, at least about 30%, at least about 35%, at least about 40%, or at least about 45% lower than that provided by a comparative catalytic article, with an upper boundary of about 50%. In some embodiments, the catalytic article of the invention reduces the CO level in a gas stream to a level that is about 1% to about 20%, about 3% to about 15%, or about 5% to about 12% lower than that provided by a comparative catalytic article. For example, in some embodiments, the method provides catalytic articles reducing the CO level in a gas stream to a level that is at least 1%, at least about 3%, at least about 5%, at least about 8%, at least about 12%, or at least about 15% lower than that provided by a comparative catalytic article, with an upper boundary of about 20%.

In certain methods of treating an engine exhaust gas stream with a catalytic article disclosed herein, the light-off temperature of the catalytic article for conversion of HC, CO, and $NO_x$ is lower than that of a comparable catalytic article comprising the same catalytic material at the same loading, but wherein the Rh is supported on a support other than the $ZrO_2$-based support component described herein. In some embodiments, the disclosed catalytic article has a light-off temperature for the conversion of HC, CO, and $NO_x$ that is about 10% to about 20%, or about 5% to about 15% lower than that of a catalytic article comprising the same catalytic material at the same loading but not containing the modified $ZrO_2$ support component. In some embodiments, the catalytic article of the disclosure has a light-off temperature for the conversion of HC that is about 1% to about 15%, or about 5% to about 10% lower (or about least about 15%, at least about 14%, at least about 13%, at least about 12%, at least about 11%, at least about 10%, at least about 9%, at least about 8%, at least about 7%, at least about 6%, at least about 5%, at least about 4%, at least about 3%, at least about 2%, or at least about 1% lower) than that of a comparative catalytic article. In some embodiments, the catalytic article of the disclosure has a light-off temperature for the conversion of CO that is about 1% to about 15%, or about 5% to about 10% lower (or at least about 15%, at least about 14%, at least about 13%, at least about 12%, at least about 11%, at least about 10%, at least about 9%, at least about 8%, at least about 7%, at least about 6%, at least about 5%, at least about 4%, at least about 3%, at least about 2%, or at least about 1% lower) than that of a comparative catalytic article. In some embodiments, the catalytic article of the disclosure has a light-off temperature for the conversion of $NO_x$ that is about 1% to about 15%, or about 5% to about 10% lower (or at least about 15%, at least about 14%, at least about 13%, at least about 12%, at least about 11%, at least about 10%, at least about 9%, at least about 8%, at least about 7%, at least about 6%, at least about 5%, at least about 4%, at least about 3%, at least about 2%, or at least about 1% lower) than that of a comparative catalytic article.

Emission Treatment System

The present invention also provides an emission treatment system generally comprising an engine producing an exhaust gas stream and a catalytic article as disclosed herein positioned downstream from the engine in fluid communication with the exhaust gas stream. The engine can be a gasoline engine and/or compressed natural gas (CNG) engine (e.g., for gasoline and compressed natural gas mobile sources such as gasoline or CNG cars and motorcycles) or can be an engine associated with a stationary source (e.g., electricity generators or pumping stations). In some embodiments, the emission treatment system further comprises one or more additional catalytic components. For example, the treatment system can include further components, such as a hydrocarbon trap, ammonia oxidation (AMOx) materials, ammonia-generating catalysts, a selective catalytic reduction (SCR) catalyst, and $NO_x$ storage and/or trapping components (LNTs). The preceding list of components is merely illustrative and should not be taken as limiting the scope of the invention. The relative placement of the various catalytic components present within the emission treatment system can vary. For example, in some embodiments, a LNT component is positioned upstream of the catalytic article as disclosed herein. In some embodiments, a AMOx component or a SCR component is located downstream of the catalytic article as disclosed herein.

Figure 3:
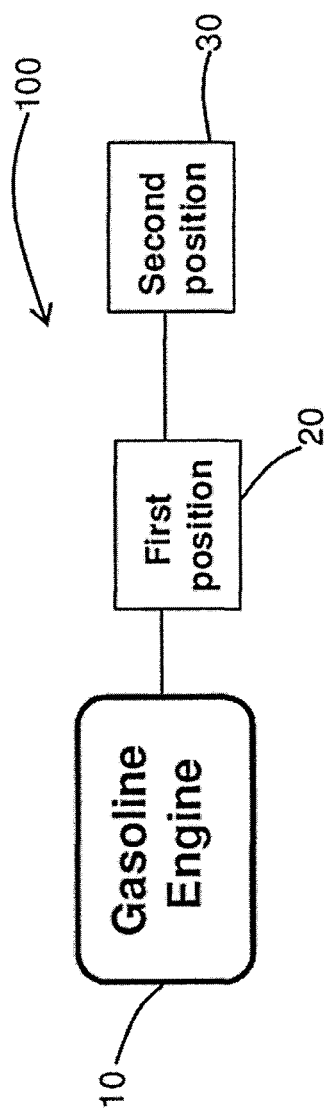
FIG. 3 is a schematic of a gasoline exhaust system.

FIG. 3 provides a schematic of a gasoline exhaust system 100 comprising a gasoline engine 10 and multiple possible locations for the catalysts: first position 20 is located closest to the gasoline engine and second position 30 is located downstream of first position 20. The first position 20 may be a close-coupled position depending on the automobile design. The second position 30 may be in an underfloor position.

Inventive catalyst composites may be located in the first position 20, the second position 30, or both.

EXAMPLES

The following non-limiting examples shall serve to illustrate the various embodiments of the present invention.

Example 1

Powder catalysts according to the present disclosure were prepared, aged and tested.

Powder catalyst preparation: 1-15 wt. % $La_2O_3$, BaO, SrO, $Al_2O_3$, $Nb_2O_5$ were doped into $ZrO_2$ materials either by incipient wetness impregnation method or co-precipitation method. The dopant precursors can be nitrates, acetates, chlorides, oxalates etc. After dopant impregnation or co-precipitation, the resulting $ZrO_2$ materials were calcined at 550° C. for 2 h, and then Rh nitrate was impregnated onto these doped $ZrO_2$ materials followed by calcination at 550° C. for 2 h again.

Aging and testing: The catalyst materials were subjected to 950/1050° C. under Lean-Rich condition with 10% steam for 5 h. A high throughput experimental reactor was used to measure light-off performance of HC, CO, NOx.

Figure 10A:
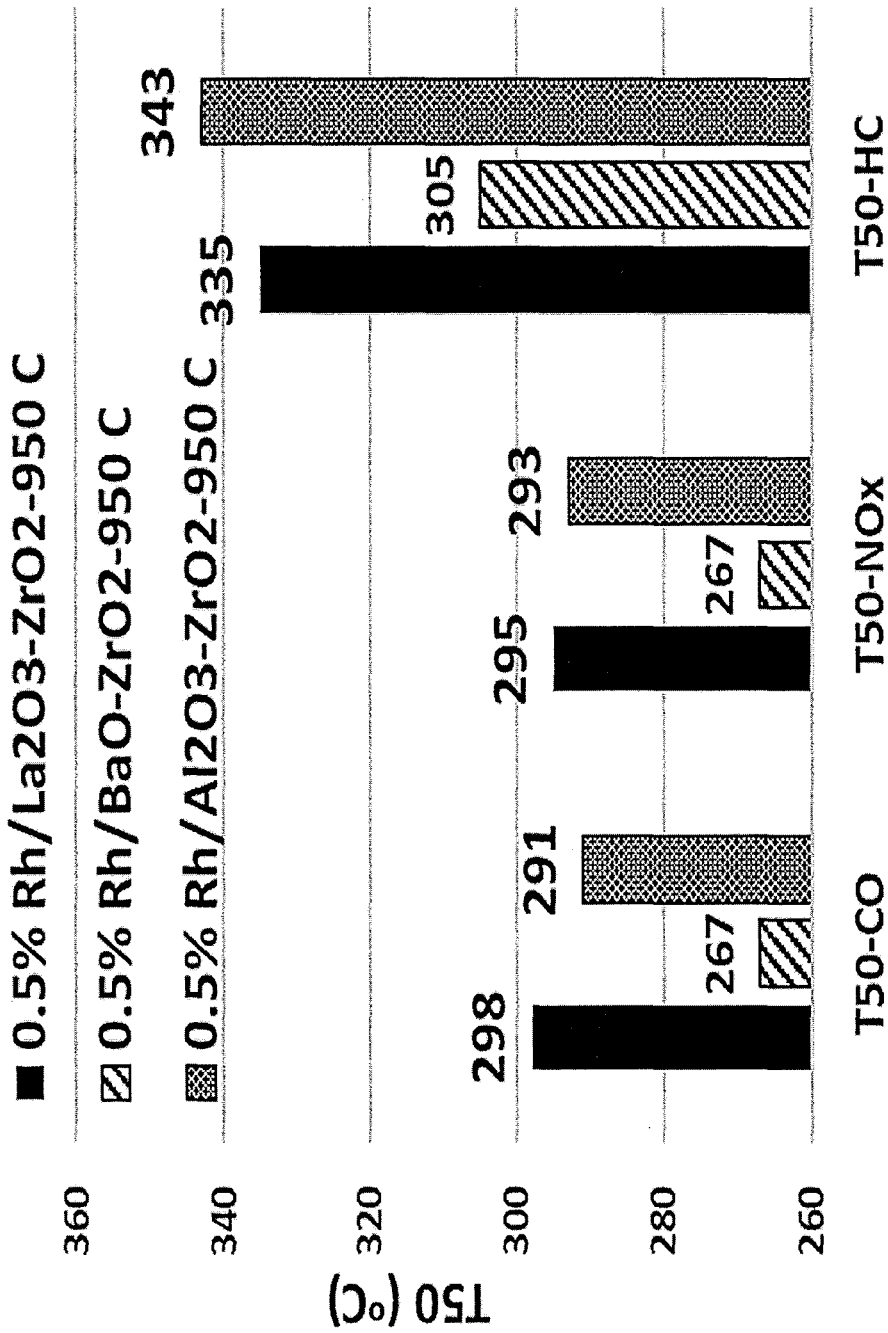
FIGS. 10A and 10B are bar graphs showing $T_{50}$ results of CO, NOx and HC during light-off tests on 950° C. and 1050° C. lean-rich (10% steam) aged catalyst samples for 5 hours.
Figure 10B:
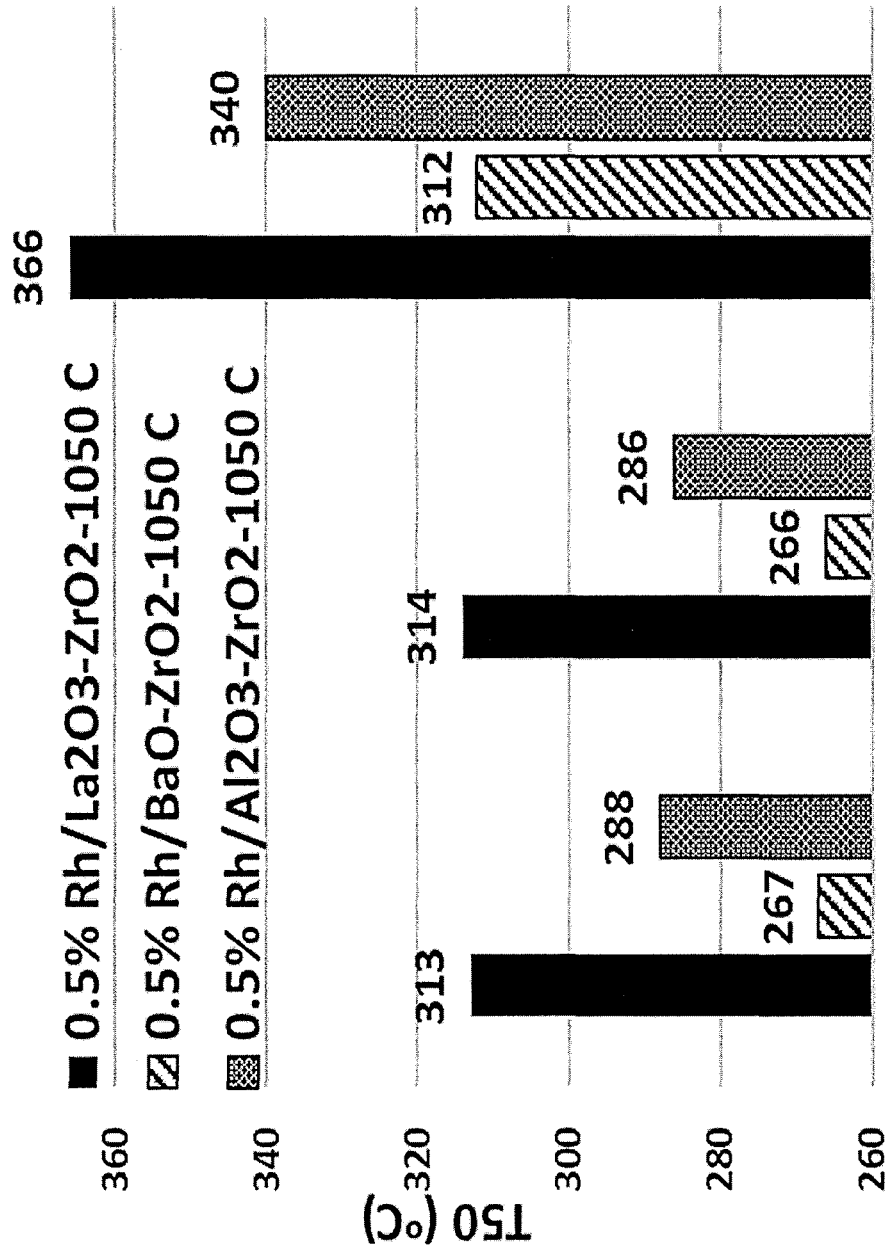

Powder catalyst testing results for 0.5 wt. % Rh supported on $La_2O_3$—$ZrO_2$, BaO—$ZrO_2$ and $Al_2O_3$—$ZrO_2$ (at 10 wt. % dopant level) were measured. As shown in FIG. 10, comparing to the Rh/$La_2O_3$—$ZrO_2$ reference, Rh/BaO—$ZrO_2$ and Rh/$Al_2O_3$—$ZrO_2$ catalysts showed improved light-off performance after 950/1050° C. aging for CO, NOx and HC (except HC light-off on Rh/$Al_2O_3$—$ZrO_2$ after 950° C. aging). The improvement of light-off performance was much more obvious on 1050° C. aged samples, indicating that the BaO and $Al_2O_3$ must have significantly impacted the property of Rh species in positive ways, thereby leading to higher TWC performance.

Example 2

Powder catalysts with different $ZrO_2$ dopants as Rh supports were compared. To better understand the promotion mechanism of BaO and $Al_2O_3$ dopants for $ZrO_2$ as Rh supports, the powder catalysts after aging at 950° C. with 10% steam for 5 h were characterized using $N_2$ physisorption, CO chemisorption and $H_2$-Temperature-Programmed Reduction (TPR) methods.

As shown in Table 1 below, the BET surface area, pore volume and pore radius of Rh/BaO—$ZrO_2$ and Rh/$Al_2O_3$—$ZrO_2$ catalysts were all much smaller than those of Rh/$La_2O_3$—$ZrO_2$ reference, suggesting that the sintering of the $ZrO_2$ component was not inhibited by the BaO or $Al_2O_3$ dopants. It was further noted that the Rh/BaO—$ZrO_2$ catalysts showed very low surface area and extremely small pore volume and pore radius, but still it showed much better light-off performance than Rh/$La_2O_3$—$ZrO_2$ reference.

TABLE 1

BET surface area, pore volume and pore radius determined from $N_2$ physisorption results (Samples were aged at 950° C. with 10% stm for 5 h)

| Samples | BET S.A. ($m^2$/g) | BJH P.V. (cc/g) | BJH P.R. (nm) |
|---|---|---|---|
| 0.5% Rh/$La_2O_3$—$ZrO_2$ | 36.3 | 0.38 | 20.0 |
| 0.5% Rh/BaO—$ZrO_2$ | 14.1 | 0.03 | 6.3 |
| 0.5% Rh/$Al_2O_3$—$ZrO_2$ | 27.9 | 0.14 | 10.5 |

S.A. = Surface Area;
P.V. = Pore Volume;
P.R. = Pore Radius

Table 2 below shows the Rh dispersion determined from CO Chemisorption results. Even though the Rh/BaO—$ZrO_2$ and Rh/$Al_2O_3$—$ZrO_2$ catalysts showed much smaller surface area than Rh/$La_2O_3$—$ZrO_2$ reference, the Rh dispersion on BaO- and $Al_2O_3$-doped $ZrO_2$ materials were actually higher than that on the reference material. In particular, the Rh dispersion on the Rh/$Al_2O_3$—$ZrO_2$ catalyst was ca. 22% higher than that on Rh/$La_2O_3$—$ZrO_2$ reference, which might be an important reason for its enhanced TWC performance.

TABLE 2

Rh dispersion determined from CO Chemisorption (Samples were aged at 950° C. with 10% stm for 5 h)

| Samples | Rh Dispersion (%) |
|---|---|
| 0.5% Rh/$La_2O_3$—$ZrO_2$ | 5.65 |
| 0.5% Rh/BaO—$ZrO_2$ | 6.31 |
| 0.5% Rh/$Al_2O_3$—$ZrO_2$ | 6.92 |

Figure 11:
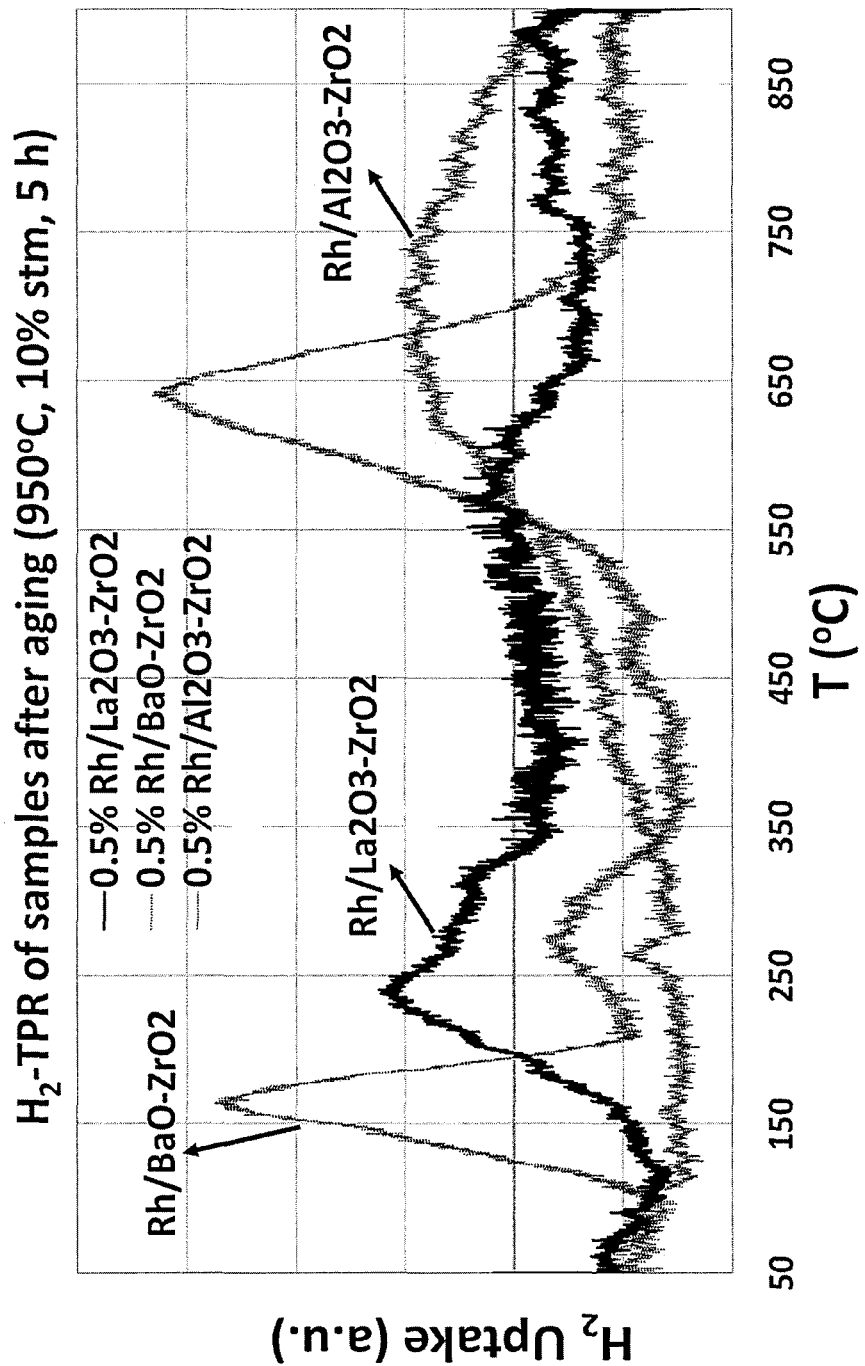
FIG. 11 is a graph showing $H_2$-Temperature-Programmed Reduction (TPR) of powder catalysts aged at 950° C. with 10% steam for 5 h.

FIG. 11 shows the $H_2$-TPR of all powder catalysts aged at 950° C. with 10% stm for 5 h. It is noted that for Rh/$La_2O_3$—$ZrO_2$ reference catalyst, overlapped $H_2$ consumption peaks were observed below 350° C. and the maximum peak was at ca. 240° C. For Rh/BaO—$ZrO_2$ catalyst, the peaks below 350° C. were more well defined, with an $H_2$ consumption peak shifted to as low as 165° C. and another peak remained at ca. 280° C. This result clearly suggests that the BaO dopant in $ZrO_2$ material greatly promoted the reducibility of RhOx species, leading to easier regeneration of catalytic active $Rh^0$ sites for NOx reduction under TWC reaction condition. In contrast, for Rh/$Al_2O_3$—$ZrO_2$ catalyst, only a small $H_2$ consumption peak at ca. 265° C. was observed, and above 350° C. the sample got reduced slowly up to 900° C. with the broad peak centered at ca. 710° C. This result means that, unlike the enhanced Rh reducibility on Rh/BaO—$ZrO_2$ catalyst, the Rh species on $Al_2O_3$—$ZrO_2$ seemed to have higher dispersion possibly due to the relatively strong interaction with AlOx species on the support surface. These AlOx species (possibly highly dispersed on $ZrO_2$) likely played a role as Rh anchoring sites, creating local catalytically active Rh/AlOx/$ZrO_2$ sites, combining the benefits from high Rh dispersion and easy Rh regeneration on $ZrO_2$.

Example 3

Catalyst designs with Rh on different $ZrO_2$ materials in top layers were compared. To see if the benefits of Rh/BaO—$ZrO_2$ and Rh/$Al_2O_3$—$ZrO_2$ observed in powder form can be successfully transferred to washcoated monolith catalysts, three washcoated catalysts on cordierite substrates were designed with a layered structure, i.e., having identical Pd bottom coats including Pd/$La_2O_3$—$Al_2O_3$, Pd/$CeO_2$—$ZrO_2$ and BaO, and different Pd+Rh top coats. In particular, as shown in FIG. 12, "Reference Catalyst" contains Rh/$La_2O_3$—$ZrO_2$ in the top layer, while "Invention Catalyst #1" and "Invention Catalyst #2" contain Rh/BaO—$ZrO_2$ and Rh/$Al_2O_3$—$ZrO_2$ respectively in the top layers.

Figure 13A:
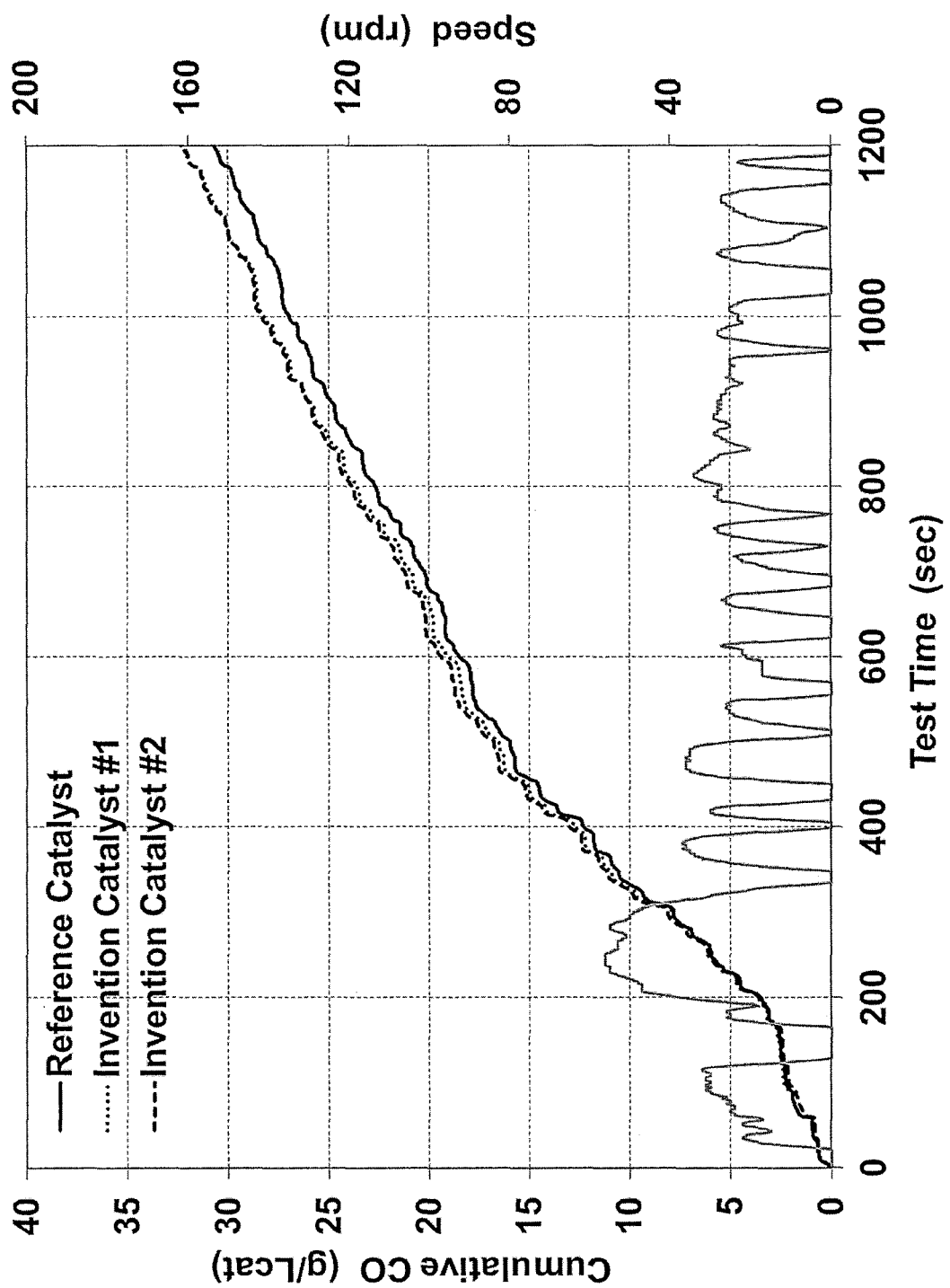
FIGS. 13A-C show FTP-72 test results on Gasoline System Simulator (GSS) for catalyst cores (1.0"×1.5", 600/4) according to FIG. 12, which were each aged on Pulse Flame Reactor (PFR) at 950° C. for 12 h.
Figure 13B:
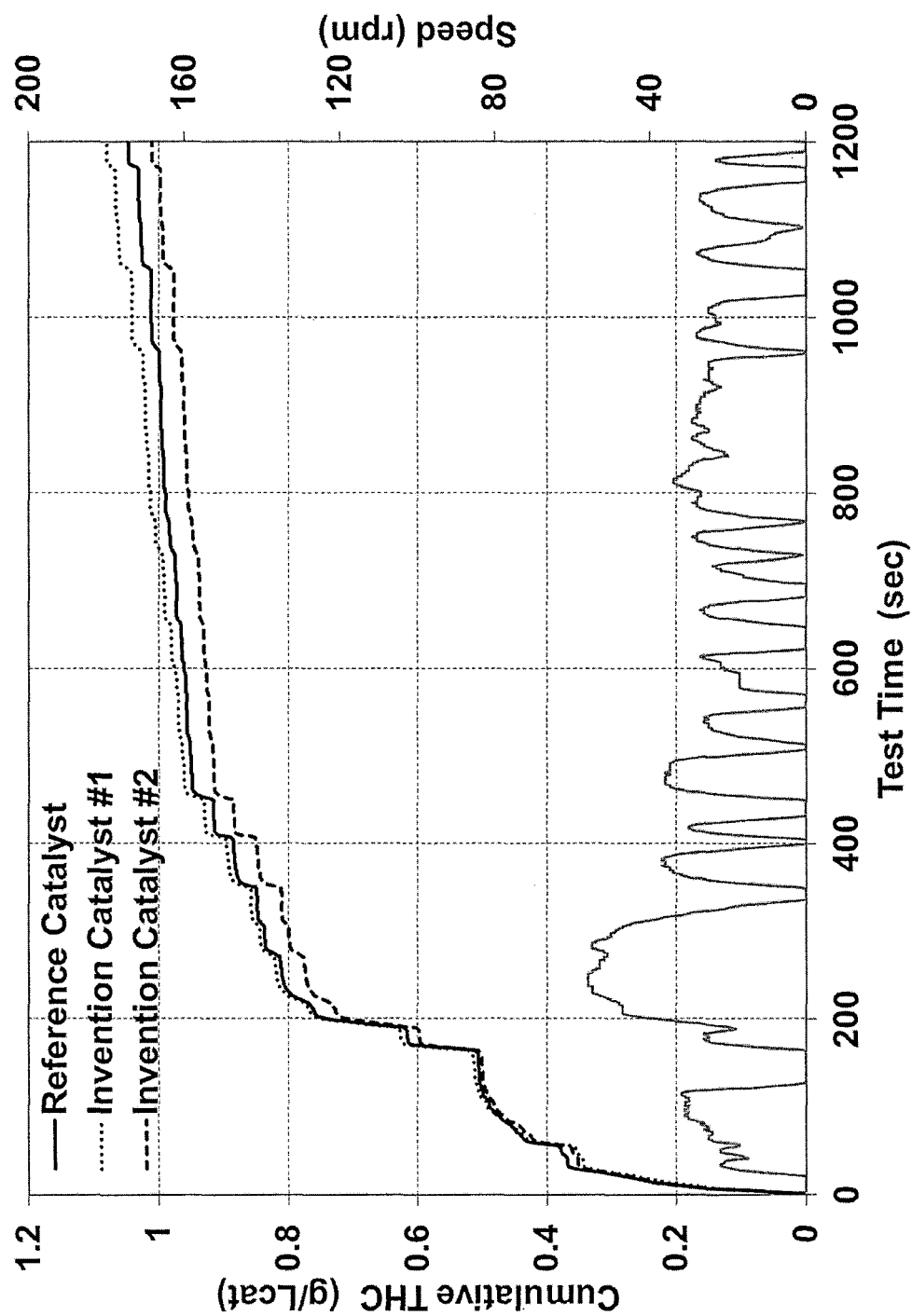
Figure 13C:
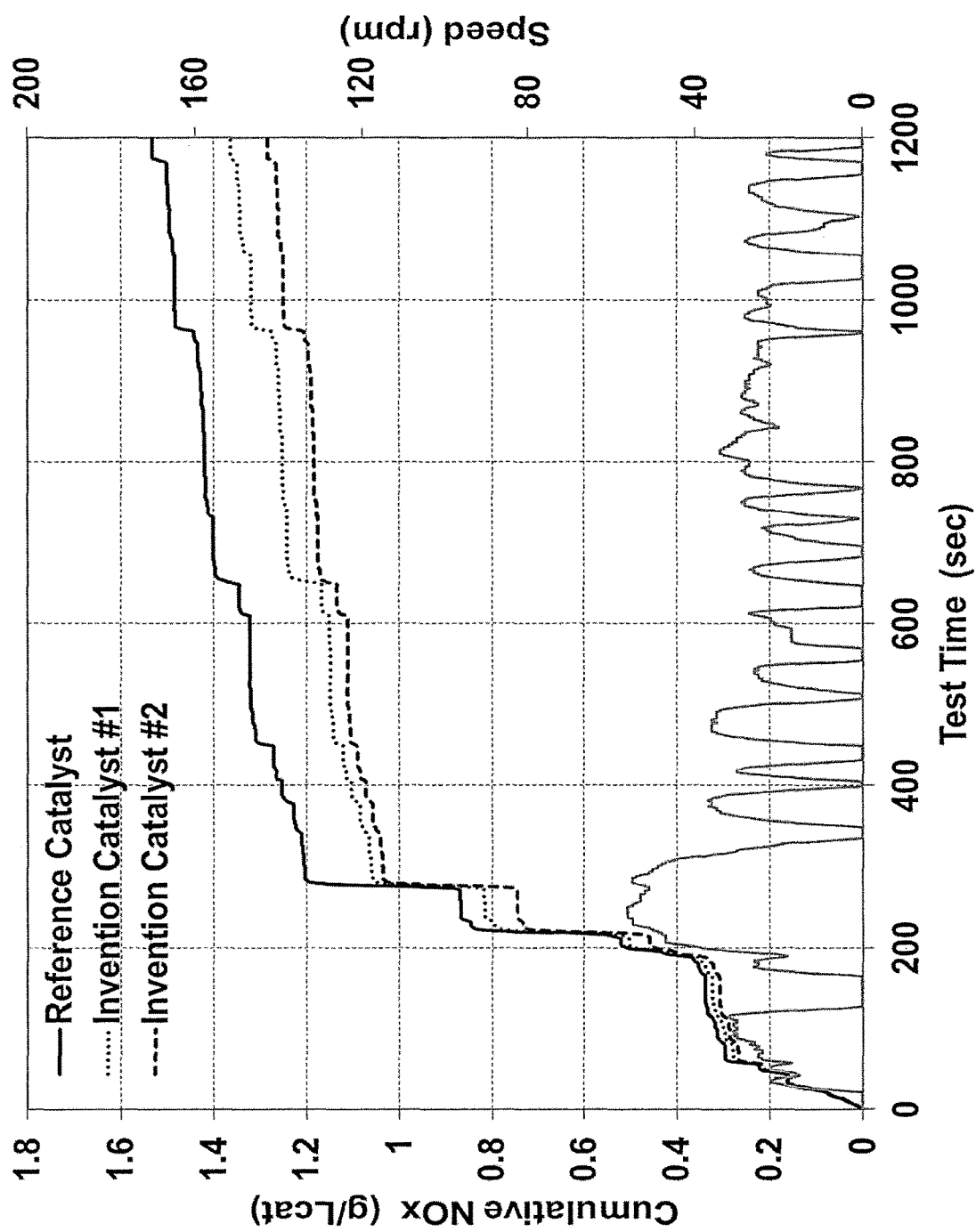
Figure 14A:
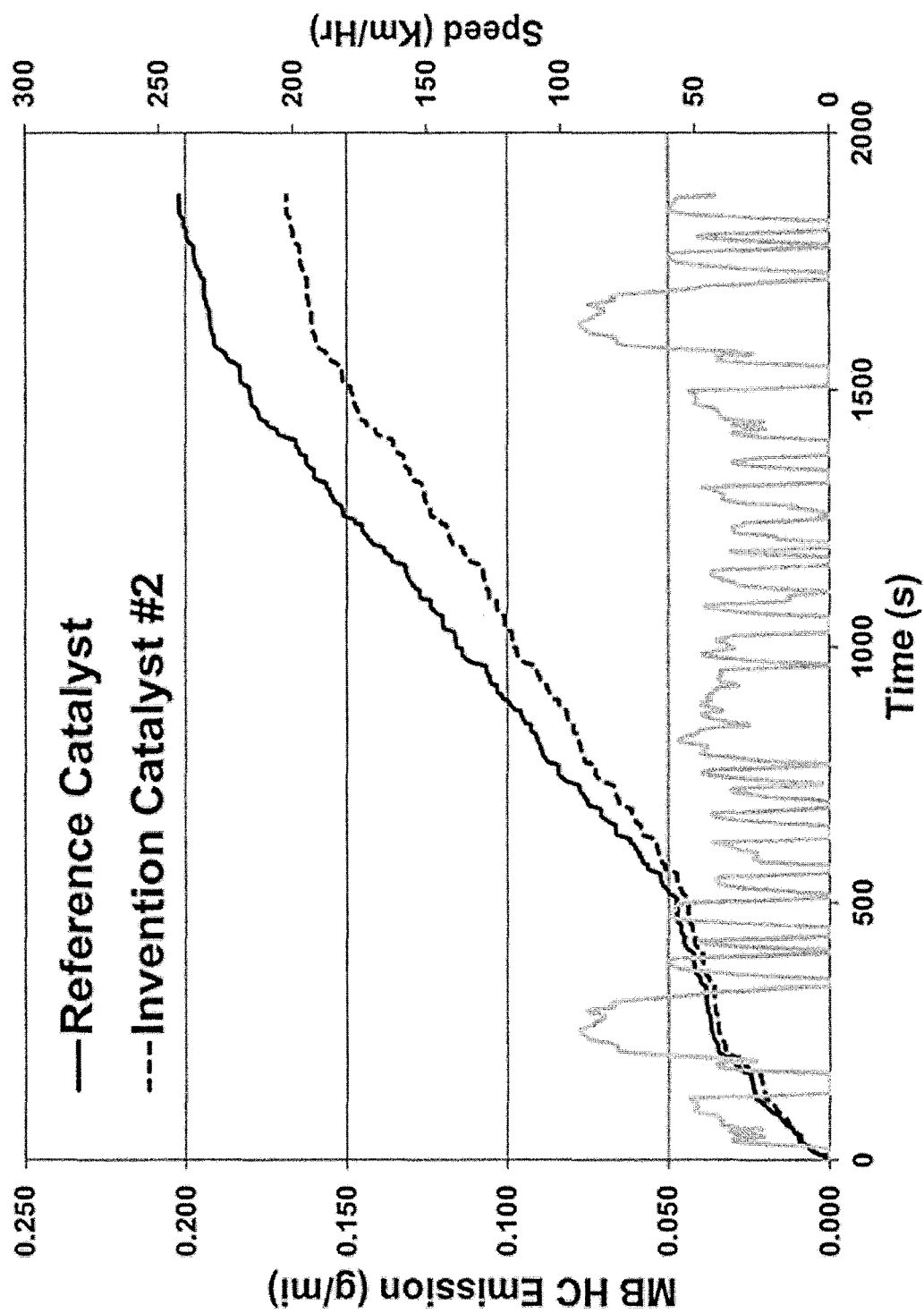
FIGS. 14A-D show cumulative mid-bed and tail-pipe emission results of HC and NOx on full part TWC catalysts (Reference Catalyst vs. Invention Catalyst #2, 4.16"×3.0", 400/4 according to FIG. 12) after aging on a real engine at 950° C. for 75 h.
Figure 14B:
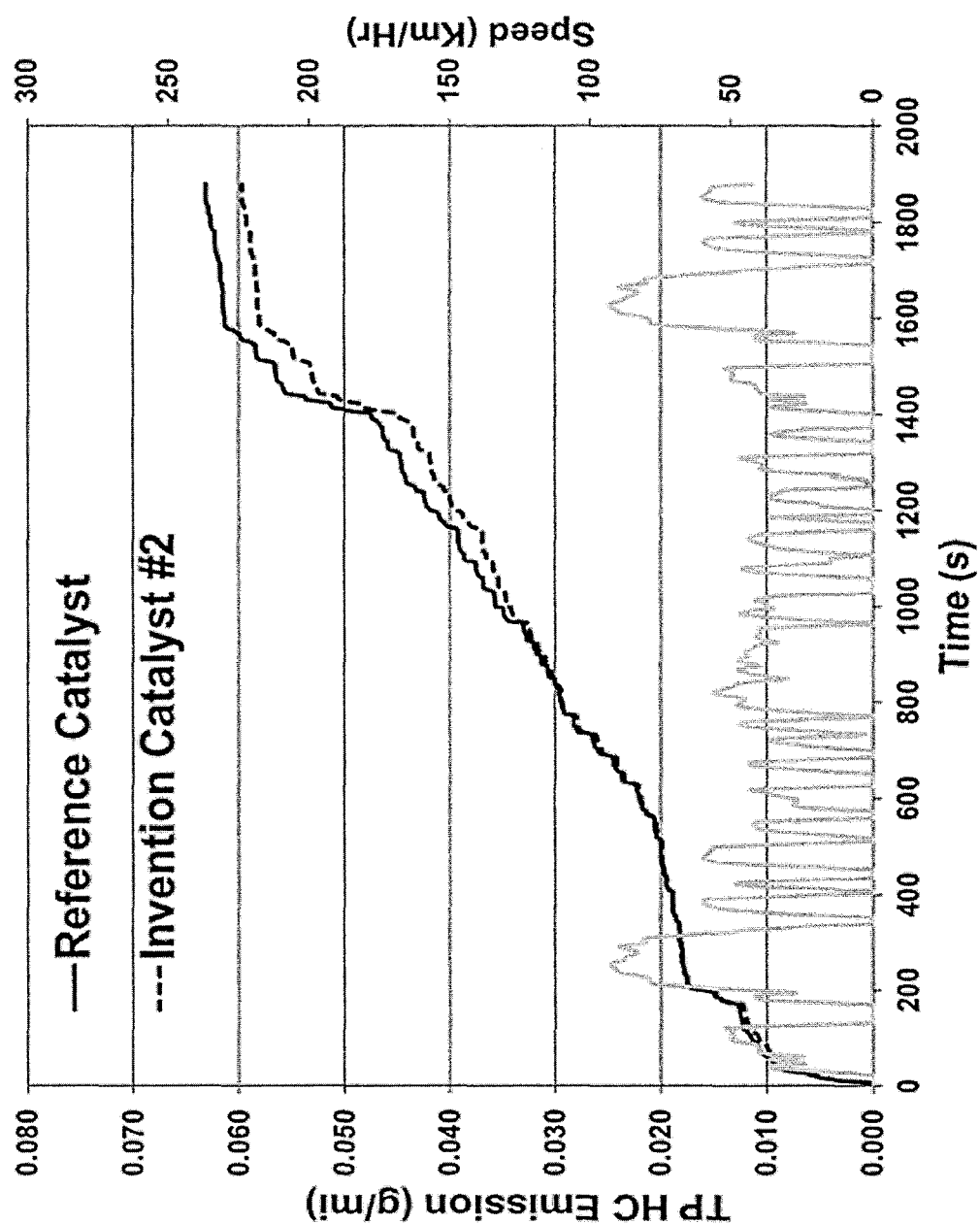
Figure 14C:
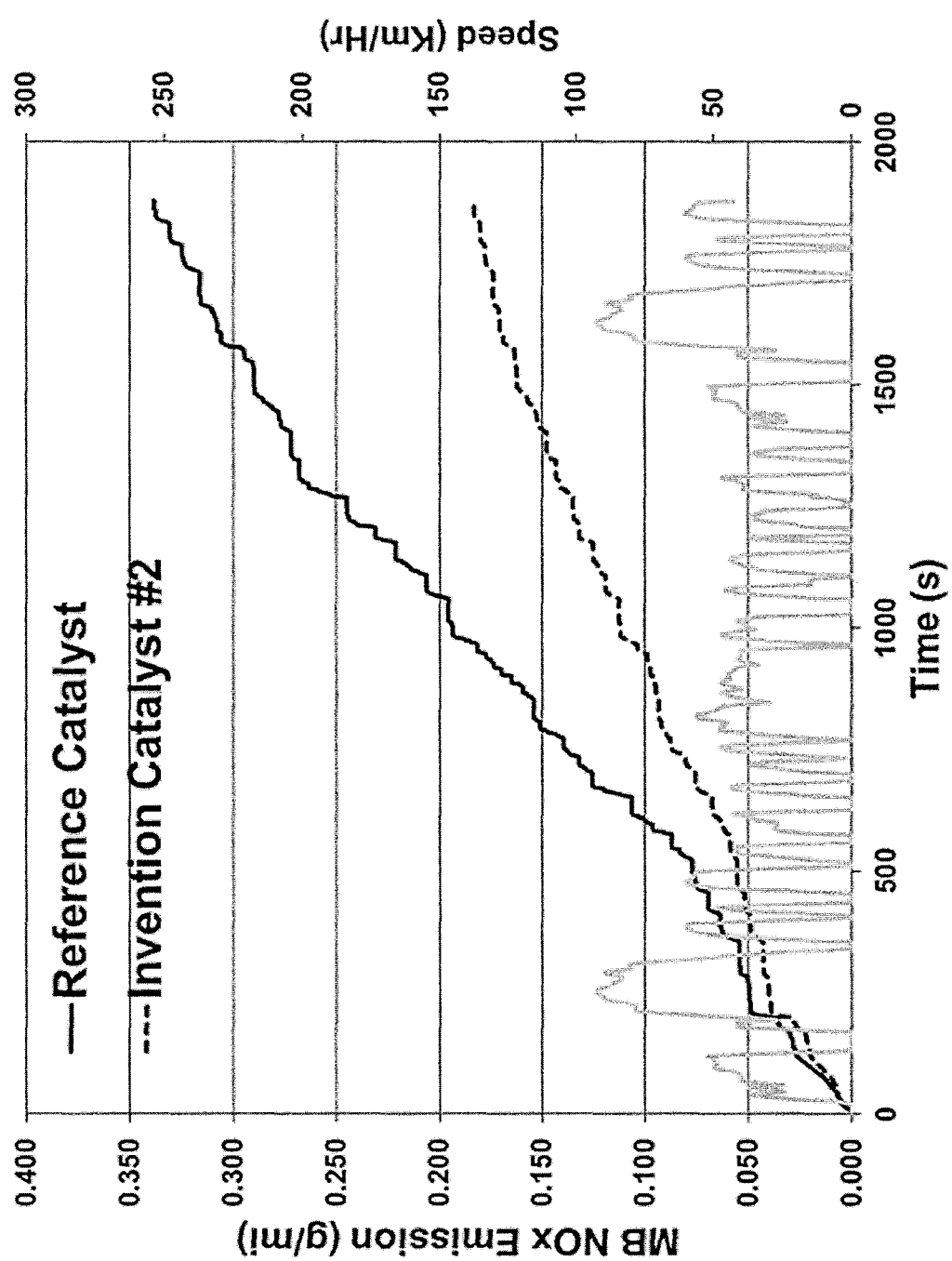
Figure 14D:
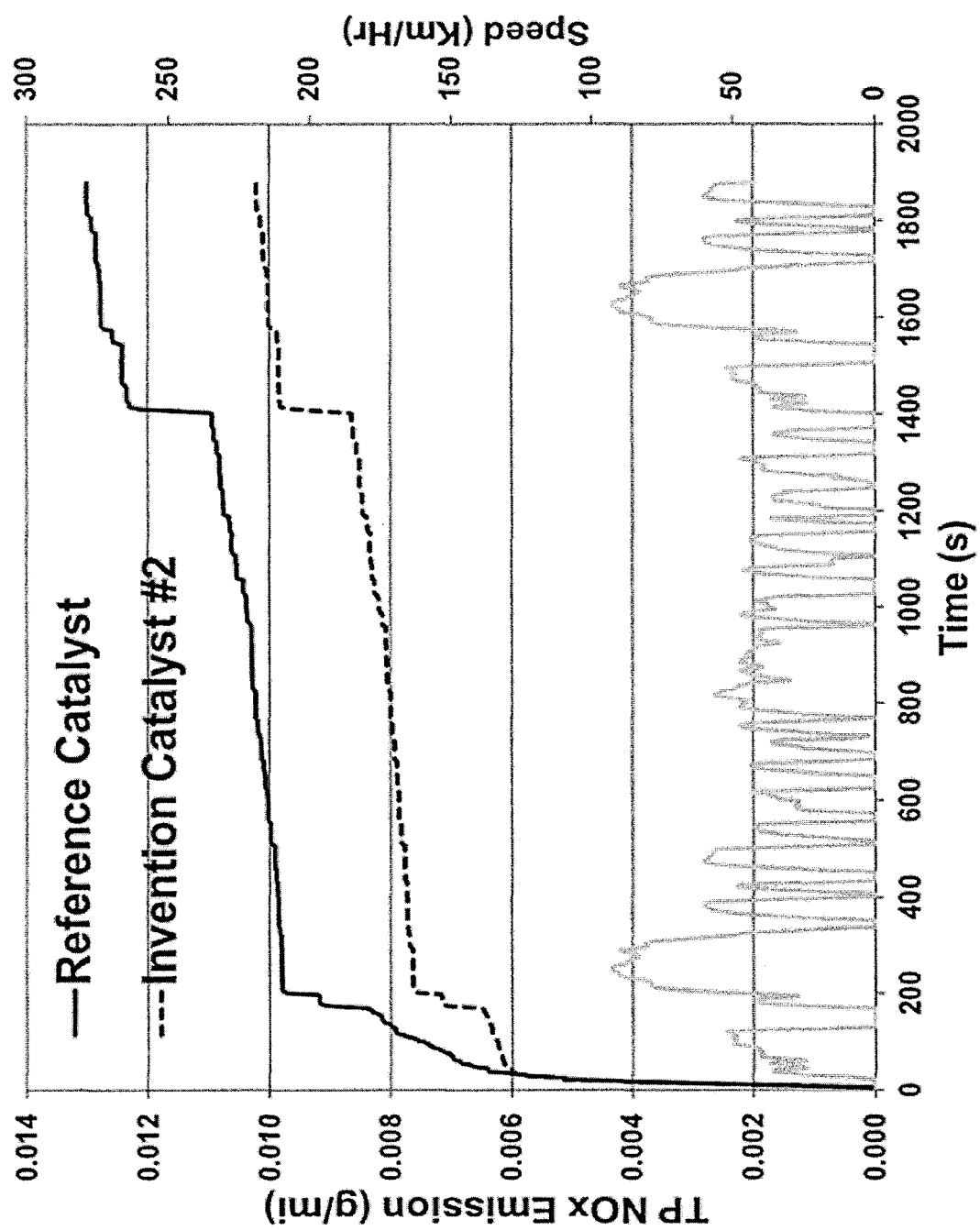

The different catalyst designs were tested on a Gasoline System Simulator (GSS). The as-prepared washcoated TWC catalysts (4.16"×1.5", 600/4) were cored to 1.0"×1.5" size, and then aged at 950° C. using Pulse Flame Reactor (PFR) at 950° C. for 12 h in full feed. Then, the cores were tested on GSS reactor using FTP-72 cycles. As can be seen from the GSS results shown in FIGS. 13A-C, the cumulative CO and HC emissions on Invention Catalysts #1 and #2 were quite similar to those on Reference Catalyst, while the cumulative NOx emission on the invention catalysts was greatly reduced. Comparing to Reference Catalyst, NOx emission on Invention Catalyst #1 was reduced by ca. 11%, and on Invention Catalyst #2, reduced by ca. 16%. These results suggest that the benefit from Rh/BaO—$ZrO_2$ and Rh/$Al_2O_3$—$ZrO_2$ powder catalysts could indeed be transferred to washcoated catalysts with a layered structure.

Example 4

The Reference Catalyst and Invention Catalyst #2 according to Example 3 above were tested on vehicle engines. The as-prepared full part washcoated catalysts (Reference Catalyst vs. Invention Catalyst #2, 4.16"×3.0", 400/4) were aged on engine at 950° C. for 75 h, and then tested as close-coupled ("CC")-1 catalysts on a real vehicle (Honda Civic) for FTP-75 cycles. The CC-2 catalyst was kept the same for all testing, which was a simple Pd bottom coat and Rh top coat catalyst with Pd:Rh loading of 14/4 g/ft$^3$. As the vehicle testing results shown in FIGS. 14A-D, the mid-bed HC emission on Invention Catalyst #2 was reduced by ca. 12% comparing to that on Reference Catalyst, while after CC-2 catalyst the tail-pipe HC emission on both catalysts became quite similar. The mid-bed and tail-pipe CO emissions on Invention Catalyst #2 were nearly identical to those on Reference Catalyst (data not shown here). For NOx emission, Invention Catalyst #2 significantly outperformed Reference Catalyst very obviously, with ca. 45% emission decrease for mid-bed and ca. 23% emission decrease for tail-pipe.

Figure 15:
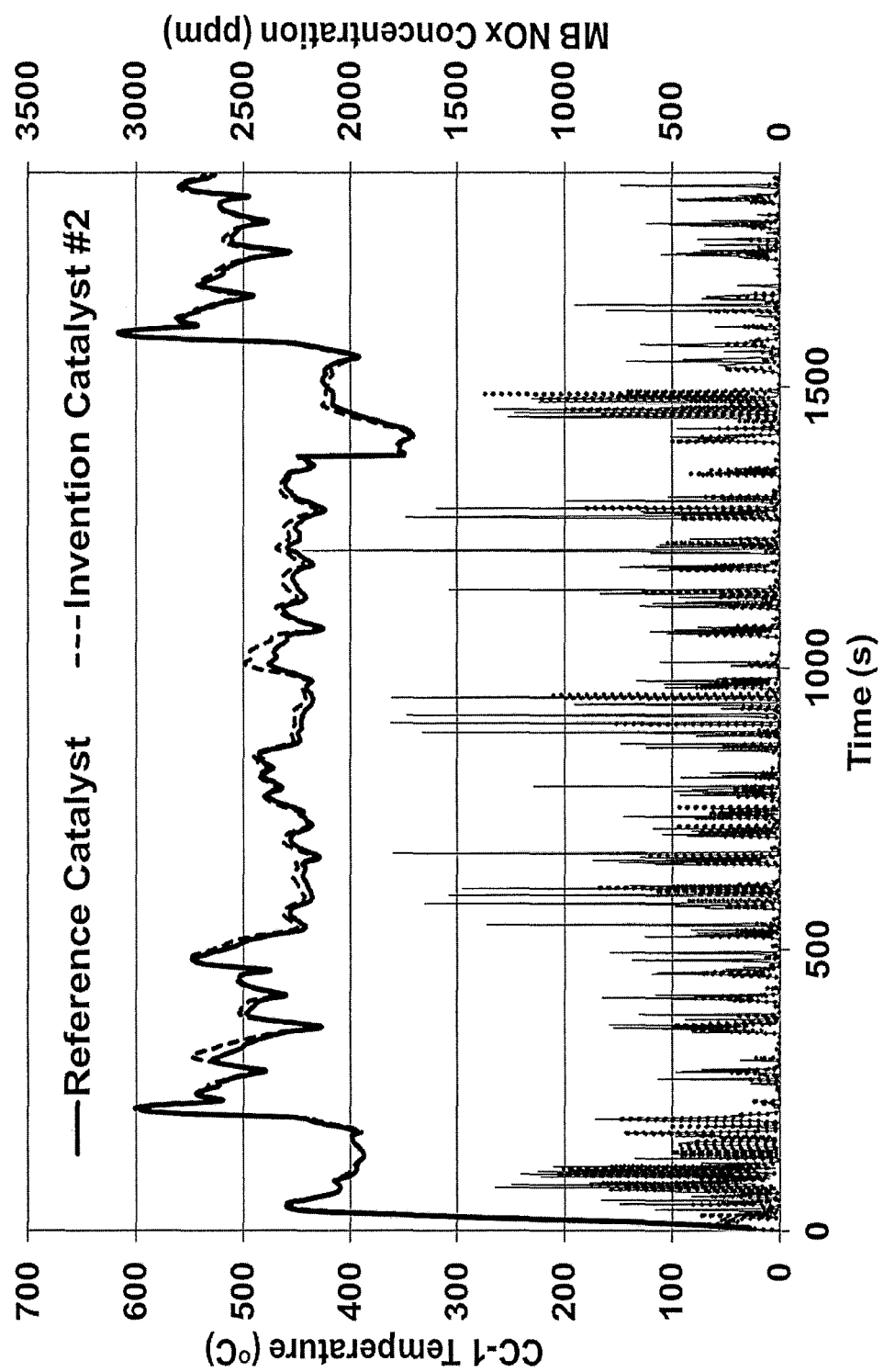
FIG. 15 shows second-by-second mid-bed NOx concentration and close-coupled (CC)-1 catalyst bed temperature on TWC catalysts with different Rh supports (Reference Catalyst vs. Invention Catalyst #2 according to FIG. 12).

As shown in FIG. 15, during the whole FTP-75 testing cycles, Reference Catalyst and Invention Catalyst #2 had very similar bed temperature, indicating that the vehicle engine was operated in quite similar conditions. The second-by-second mid-bed NOx concentration after Invention Catalyst #2 was always lower than that after Reference Catalyst, including the cold-start region, high space velocity region, and hot-start region. This huge improvement in NOx performance on Invention Catalyst #2 clearly indicates that the Rh species on $Al_2O_3$—$ZrO_2$ was quite stable and effective even after aging in harsh conditions.

That which is claimed:

1. A catalyst composition comprising:
   a rhodium component impregnated on a support material, wherein the support material is a zirconia-based support material comprising zirconia doped with baria, alumina, or combinations thereof;
   wherein the zirconia-based support material comprises zirconia in an amount ranging from about 80 wt. % to about 99 wt. %.

2. The catalyst composition of claim 1, wherein the zirconia-based support material is co-doped with at least one chosen from $La_2O_3$, $Y_2O_3$, $Nd_2O_3$, and $Pr_6O_{11}$.

3. The catalyst composition according to claim 1, wherein the rhodium component is present in an amount ranging from about 0.01 wt. % to about 10 wt. % based on the total weight of the catalyst composition.

4. The catalyst composition according to claim 1, wherein the zirconia-based support material is baria-doped zirconia, and wherein barium is present in an amount ranging from about 0.5 wt. % to about 20 wt. % based on the total weight of the zirconia-based support material.

5. The catalyst composition according to claim 1, wherein the zirconia-based support material is alumina-doped zirconia, and wherein aluminum is present in an amount ranging from about 0.5 wt. % to about 10 wt. % based on the total weight of the zirconia-based support material.

6. A catalytic article comprising:
   a catalytic material on a substrate, wherein the catalytic material comprises:
   a first layer comprising a platinum group metal (PGM) component impregnated on a porous support material; and
   a second layer comprising the catalyst composition according to claim 1.

7. The catalytic article according to claim 6, wherein at least a portion of the porous support material comprises an oxygen storage component chosen from ceria, zirconia, lanthana, yttria, neodymia, praseodymia, niobia, and combinations thereof.

8. The catalytic article according to claim 7, wherein the oxygen storage component is ceria-zirconia, and comprises ceria in an amount ranging from about 5 wt. % to about 75 wt. %.

9. The catalytic article according to claim 6, wherein at least a portion of the porous support material is a refractory metal oxide support material chosen from alumina, lanthana-alumina, ceria-alumina, zirconia-alumina, ceria-zirconia-alumina, lanthana-zirconia-alumina, lanthana-neodymia-alumina, and combinations thereof.

10. The catalytic article of according to claim 6, wherein the PGM component is a palladium component.

11. The catalytic article of according to claim 6, wherein the second layer further comprises barium oxide, magnesium oxide, calcium oxide, strontium oxide, lanthanum oxide, cerium oxide, zirconium oxide, manganese oxide, copper oxide, iron oxide, praseodymium oxide, yttrium oxide, neodymium oxide, or any combination thereof.

12. The catalytic article according to claim 6, wherein the first layer comprises barium oxide and a palladium component impregnated on ceria-zirconia or lanthana-alumina.

13. The catalytic article according to, 6, wherein the first layer is directly disposed on the substrate and the second layer is disposed on top of the first layer.

14. The catalytic article according to 6, wherein the substrate is a metal honeycomb substrate, or ceramic monolithic honeycomb substrate.

15. The catalytic article according to claim 6, wherein the substrate is a wall flow filter substrate or a flow through substrate.

16. A method of making the catalytic article according to claim 6, comprising:
   disposing the catalytic material on the substrate to yield a catalytic material-coated substrate, and
   calcining the catalytic material-coated substrate to render the catalytic article.

17. A method for reducing CO, HC, and $NO_x$ levels in a gas stream, comprising contacting the gas stream with the catalytic article of claim 6 for a time and at a temperature sufficient to reduce CO, HC, and $NO_x$ levels in the gas stream.

18. The method according to claim 17, wherein the CO, HC, and $NO_x$ levels in the gas stream are reduced by at least 50% compared to the CO, HC, and $NO_x$ levels in the gas stream prior to contact with the catalytic article.

19. An emission treatment system for treatment of an exhaust gas stream, the emission treatment system comprising:
   an engine producing an exhaust gas stream; and
   the catalytic article of claim 6 positioned downstream from the engine in fluid communication with the exhaust gas stream and adapted for the abatement of CO and HC and conversion of $NO_x$ to $N_2$.

20. The emission treatment system according to claim 19, wherein the engine is a gasoline engine or diesel engine.

* * * * *